United States Patent
Takano et al.

(10) Patent No.: US 9,491,670 B2
(45) Date of Patent: Nov. 8, 2016

(54) USER EQUIPMENT, METHOD FOR PERFORMING HANDOVER, BASE STATION, AND RADIO COMMUNICATION SYSTEM

(75) Inventors: Hiroaki Takano, Tokyo (JP); Takushi Kunihiro, Tokyo (JP)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 13/514,141

(22) PCT Filed: Dec. 6, 2010

(86) PCT No.: PCT/JP2010/007091
§ 371 (c)(1),
(2), (4) Date: Jun. 6, 2012

(87) PCT Pub. No.: WO2011/074203
PCT Pub. Date: Jun. 23, 2011

(65) Prior Publication Data
US 2012/0236830 A1    Sep. 20, 2012

(30) Foreign Application Priority Data
Dec. 16, 2009    (JP) ................ 2009-285372

(51) Int. Cl.
*H04W 36/00*    (2009.01)
*H04L 5/00*    (2006.01)
*H04L 27/26*    (2006.01)
*H04W 4/00*    (2009.01)

(52) U.S. Cl.
CPC .......... *H04W 36/0072* (2013.01); *H04L 5/001* (2013.01); *H04L 27/2607* (2013.01); *H04L 27/2657* (2013.01); *H04W 36/0005* (2013.01)

(58) Field of Classification Search
CPC ........... H04W 36/18; H04W 36/0011; H04W 36/14; H04W 36/08; H04W 36/0072; H04L 5/001
USPC ......................................................... 370/331
See application file for complete search history.

(56) References Cited

U.S. PATENT DOCUMENTS

| 2006/0013325 | A1* | 1/2006 | Agrawal et al. ............. 375/260 |
| 2008/0227454 | A1* | 9/2008 | Damnjanovic ............. 455/436 |
| 2009/0310563 | A1* | 12/2009 | Chou et al. .................. 370/331 |
| 2010/0054184 | A1 | 3/2010 | Kishiyama et al. |
| 2010/0303039 | A1* | 12/2010 | Zhang et al. ................. 370/331 |

FOREIGN PATENT DOCUMENTS

| JP | 2008 118309 | 5/2008 |
| JP | 2008-118309 A | 5/2008 |
| JP | 2009 232293 | 10/2009 |

OTHER PUBLICATIONS

3GPP TSG RAN WG1#54bis, R1-082448, Carrier Aggregation in Advanced E-UTRA, Huawei.*

(Continued)

*Primary Examiner* — Alpus H Hsu
*Assistant Examiner* — Walter Divito
(74) *Attorney, Agent, or Firm* — Chip Law Group

(57) ABSTRACT

A mobile station in a wireless communication network. The mobile station including a radio communication unit that communicates with a first base station via a plurality of component carriers, and a control unit that controls the radio communication unit to initiate a handover procedure to a second base station after receiving at least one handover command.

20 Claims, 15 Drawing Sheets

(56) References Cited

OTHER PUBLICATIONS

3GPP TSG RAN WG2 Meeting #67 R2-094731, Intra LTE-A UE Handover Procedure inter-eNB for CA, Huawei, Total pages 5, (Aug. 24 to 28, 2009).

3GPP TSG RAN WG2 Meeting #66bis R2-093722, "Handover for Carrier Aggregation," CATT, Total pages 3, (Jun. 29 to Jul. 3, 2009).

International Search Report Issued Jan. 18, 2011 in PCT/JP10/07091 Filed Dec. 6, 2010.

U.S. Appl. No. 13/514,163, filed Jun. 6, 2012, Takano, et al.
U.S. Appl. No. 13/503,037, filed Apr. 20, 2012, Takano, et al.
U.S. Appl. No. 13/508,382, filed May 7, 2012, Sawai, et al.
U.S. Appl. No. 14/520,948, filed Oct. 22, 2014, Takano, et al.

* cited by examiner (CONTINUE TO FIG. 8B)

USER EQUIPMENT, METHOD FOR PERFORMING HANDOVER, BASE STATION, AND RADIO COMMUNICATION SYSTEM

TECHNICAL FIELD

The present invention relates to a user equipment, a method for performing a handover, a base station, and a radio communication system.

BACKGROUND ART

In Long Term Evolution-Advanced (LTE-A), which is the next-generation cellular communication standard that is discussed in Third Generation Partnership Project (3GPP), introduction of technology called carrier aggregation (CA) has been studied. The carrier aggregation is technology that forms a communication channel between a user equipment (UE) and a base station (BS, or evolved Node B (eNB)) by aggregating a plurality of frequency bands that are supported in LTE, for example, and thereby improves communication throughput. Each frequency band included in one communication channel by the carrier aggregation is called a component carrier (CC). The bandwidths of frequency bands that are available in LTE are 1.4 MHz, 3.0 MHz, 5.0 MHz, 10 MHz, 15 MHz, and 20 MHz. Accordingly, if five bands of 20 MHz are aggregated as component carriers, a communication channel of 100 MHz in total can be formed.

Component carriers that are included in one communication channel in the carrier aggregation are not necessarily contiguous to one another in the frequency direction. The mode in which component carriers are arranged contiguous to one another in the frequency direction is called a contiguous mode. On the other hand, the mode in which component carriers are arranged not contiguous to one another is called a non-contiguous mode.

Further, in the carrier aggregation, the number of component carriers in an uplink and the number of component carriers in a downlink are not necessarily equal. The mode in which the number of component carriers in an uplink and the number of component carriers in a downlink are equal is called a symmetric mode. On the other hand, the mode in which the number of component carriers in an uplink and the number of component carriers in a downlink are not equal is called an asymmetric mode. For example, in the case of using two component carriers in an uplink and three component carriers in a downlink, it is asymmetric carrier aggregation.

Further, in LTE, any one of frequency division duplex (FDD) and time division duplex (TDD) can be used as duplex operation. Because the direction of a link (uplink or downlink) of each component carrier does not change in time in FDD, FDD is better suited to the carrier aggregation compared to TDD.

A handover, which is a basic technique for achieving the mobility of a user equipment in the cellular communication standard, is one of important subjects in LTE-A. In LTE, a user equipment measures a communication quality over a channel with a serving base station (a currently connected base station) and communication qualities with peripheral base stations and transmits a measurement report containing measurements to the serving base station. Receiving the measurement report, the serving base station determines whether to execute a handover based on the measurements contained in the report. Then, if it is determined that a handover is to be executed, a handover is carried out among a source base station (the serving base station before a handover), the user equipment, and a target base station (a serving base station after a handover) in accordance with a prescribed procedure (e.g. cf. Patent Literature 1 below)

CITATION LIST

Patent Literature

PTL 1: Japanese Unexamined Patent Application Publication No. 2009-232293

SUMMARY OF INVENTION

Technical Problem

However, no case has been reported where active consideration is given to how to carry out a handover procedure in a radio communication involving the carrier aggregation.

For example, when executing a handover for each of component carriers, a situation occurs where a handover is completed for a part of a plurality of component carriers and a handover is not completed for the rest of the plurality of component carriers. In such a situation, when a cyclic prefix length used by a source base station and a cyclic prefix length used by a target base station are different, for example, there is a possibility that a radio communication unit of a user equipment needs to handle the both of cyclic prefix lengths simultaneously. However, implementing a user equipment which incorporates a radio communication unit that can simultaneously handle different cyclic prefix lengths results in complication of a circuit, an increase in manufacturing cost and an increase in processing load. Further, the necessity of defining a new protocol for aggregating a plurality of signals having different cyclic prefix lengths in an upper layer arises.

In light of the foregoing, it is desirable to provide a novel and improved user equipment, method for performing a handover, base station and radio communication system that can avoid simultaneous handling of different cyclic prefix lengths during a handover procedure in a radio communication involving the carrier aggregation.

Solution to Problem

According to one embodiment, the present invention is directed to a mobile station in a wireless communication network, the mobile station comprising: a radio communication unit configured to communicate with a first base station via a plurality of component carriers; and a control unit configured to control the radio communication unit to initiate a handover procedure to a second base station after receiving at least one handover command for the plurality of component carriers.

The radio communication unit may be configured to communicate with the first base station via one of the plurality of component carriers having a first cyclic prefix length, and communicate with the second base station via one of the plurality of component carriers having a second cyclic prefix length. The radio communication may be configured to receive a plurality of handover commands, each corresponding to one of the plurality of component carriers, and the control unit may be configured to control the radio communication unit to initiate a handover procedure to the second base station for each of the plurality of component carriers after receiving the plurality of handover commands.

According to another embodiment, the present invention is directed to a mobile station in a wireless communication network, the mobile station comprising: a radio communication unit configured to communicate with a first base station via a plurality of component carriers each having a first cyclic prefix length; and a control unit configured to control the radio communication unit to initiate a handover procedure from the first base station to a second base station after receiving a handover command, wherein, after a handover for one of the plurality of component carriers, the control unit is configured to control the radio communication unit to communicate with the second base station via a component carrier allocated to a time slot different from a time slot to which each of the plurality of component carriers are allocated, and having a second cyclic prefix length different from the first cyclic prefix length. The control unit may be configured to control the radio communication unit to release a first one of the plurality of component carrier connections with the first base station and to connect to the second base station using the component carrier having the second cyclic prefix length. The control unit may further be configured to control the radio communication unit to initiate a handover procedure to the second base station for a second one of the plurality of component carriers after the handover procedure for the first one of the plurality of component carriers has been initiated.

According to another embodiment, the present invention is directed to a base station in a wireless communication network, the base station comprising: a radio communication unit configured to communicate with a mobile station via a plurality of component carriers; and a control unit configured to control the radio communication unit to initiate a handover procedure to a second base station for one of the plurality of component carriers after receiving a report from the mobile station corresponding to the one of the plurality of component carriers. The control unit may be configured to initiate the handover procedure by controlling the radio communication unit to transmit a handover request command to the second base station and transmit a handover command to the mobile station.

According to another embodiment, the present invention is directed to a base station in a wireless communication network, the base station comprising: a radio communication unit configured to communicate with a mobile station via a plurality of component carriers each having a first cyclic prefix length; and a control unit configured to control the radio communication unit to initiate a handover procedure to a second base station for one of the plurality of component carriers, wherein, after a handover for one of the plurality of component carriers, the mobile station communicates with the second base station via a component carrier allocated to a time slot different from a time slot to which each of the plurality of component carriers is allocated, and having a second cyclic prefix length different from the first cyclic prefix length.

According to another embodiment, the present invention is directed to a handover method performed by a mobile station in a wireless communication network, the method comprising: communicating, by a radio communication unit of the mobile station, with a first base station via a plurality of component carriers; and initiating, by a control unit of the mobile station, a handover procedure to a second base station after receiving at least one handover command for the plurality of component carriers.

According to another embodiment, the present invention is directed to a handover method performed by a mobile station in a wireless communication network, the method comprising: communicating, by a radio communication unit of the mobile station, with a first base station via a plurality of component carriers each having a first cyclic prefix length; initiating, by a control unit of the mobile station, a handover procedure from the first base station to the second base station after receiving a handover command; and controlling, by the control unit after a handover for one of the plurality of component carriers, the radio communication unit to communicate with the second base station via a component carrier allocated to a time slot different from a time slot to which each of the plurality of component carriers are allocated, and having a second cyclic prefix length different from the first cyclic prefix length.

According to another embodiment, the present invention is directed to a handover method performed by a base station in a wireless communication network, the method comprising: communicating, by a radio communication unit of the base station, with a mobile station via a plurality of component carriers; and initiating, by a control unit of the base station, a handover procedure to a second base station for one of the plurality of component carriers after receiving a report from the mobile station corresponding to the one of the plurality of component carriers.

According to another embodiment, the present invention is directed to a handover method performed by a base station in a wireless communication network, the method comprising: communicating, by a radio communication unit of the base station, with a mobile station via a plurality of component carriers each having a first cyclic prefix length; and initiating, by a control unit of the base station, a handover procedure to a second base station for one of the plurality of component carrier; wherein, after a handover for one of the plurality of component carriers, the mobile station communicates with the second base station via a component carrier allocated to a time slot different from a time slot to which each of the plurality of component carriers is allocated, and having a second cyclic prefix length different from the first cyclic prefix length According to another embodiment, the present invention is directed to a non-transitory computer readable medium including computer-program instructions, which when executed by a mobile station in a wireless communication network, cause the mobile station to perform a handover method comprising: communicating with a first base station via a plurality of component carriers; and initiating a handover procedure to a second base station after receiving at least one handover command for the plurality of component carriers.

According to another embodiment, the present invention is directed to A non-transitory computer readable medium including computer-program instructions, which when executed by a mobile station in a wireless communication network, cause the mobile station to perform a handover method comprising: communicating with a first base station via a plurality of component carriers each having a first cyclic prefix length; initiating a handover procedure from the first base station to the second base station after receiving a handover command; and communicating, after a handover for one of the plurality of component carriers, with the second base station via a component carrier allocated to a time slot different from a time slot to which each of the plurality of component carriers are allocated, and having a second cyclic prefix length different from the first cyclic prefix length.

According to another embodiment, the present invention is directed to a non-transitory computer readable medium including computer-program instructions, which when executed by a base station in a wireless communication network, cause the base station to perform a handover method comprising: communicating with a mobile station via a plurality of component carriers; and initiating a handover procedure to a second base station for one of the plurality of component carriers after receiving a report from the mobile station corresponding to the one of the plurality of component carriers.

According to another embodiment, the present invention is directed to a non-transitory computer readable medium including computer-program instructions, which when executed by a base station in a wireless communication network, cause the base station to perform a handover method comprising: communicating with a mobile station via a plurality of component carriers each having a first cyclic prefix length; and initiating a handover procedure to a second base station for one of the plurality of component carriers, wherein, after a handover for one of the plurality of component carriers, the mobile station communicates with the second base station via a component carrier allocated to a time slot different from a time slot to which each of the plurality of component carriers is allocated, and having a second cyclic prefix length different from the first cyclic prefix length.

According to another embodiment, the present invention is directed to a wireless communication system comprising: a mobile station including a radio communication unit configured to communicate with a first base station via a plurality of component carriers; a first control unit at the first base station configured to initiate a handover procedure to a second base station for one of the plurality of component carriers after receiving a report from the mobile station corresponding to the one of the plurality of component carriers; and a second control unit at the mobile station configured to initiate a handover procedure to the second base station after receiving at least one handover command for the plurality of component carriers from the first base station.

According to another embodiment, the present invention is directed to A wireless communication system comprising: a first base station configured to communicate with a mobile station via a plurality of component carriers each having a first cyclic prefix length; the mobile station configured to initiate a handover procedure from the first base station to a second base station for one of the plurality of component carriers after receiving a handover command from the first base station; and the second base station configured to communicate with the mobile station via a component carrier allocated to a time slot different from a time slot to which each of the plurality of component carriers is allocated, and having a second cyclic prefix length different from the first cyclic prefix length.

Advantageous Effects of Invention

As described above, the user equipment, the method for performing a handover, the base station and the radio communication system according to the embodiments of the present invention can avoid simultaneous handling of different cyclic prefix lengths during a handover procedure in a radio communication involving the carrier aggregation.

DESCRIPTION OF EMBODIMENTS

Figure 1:
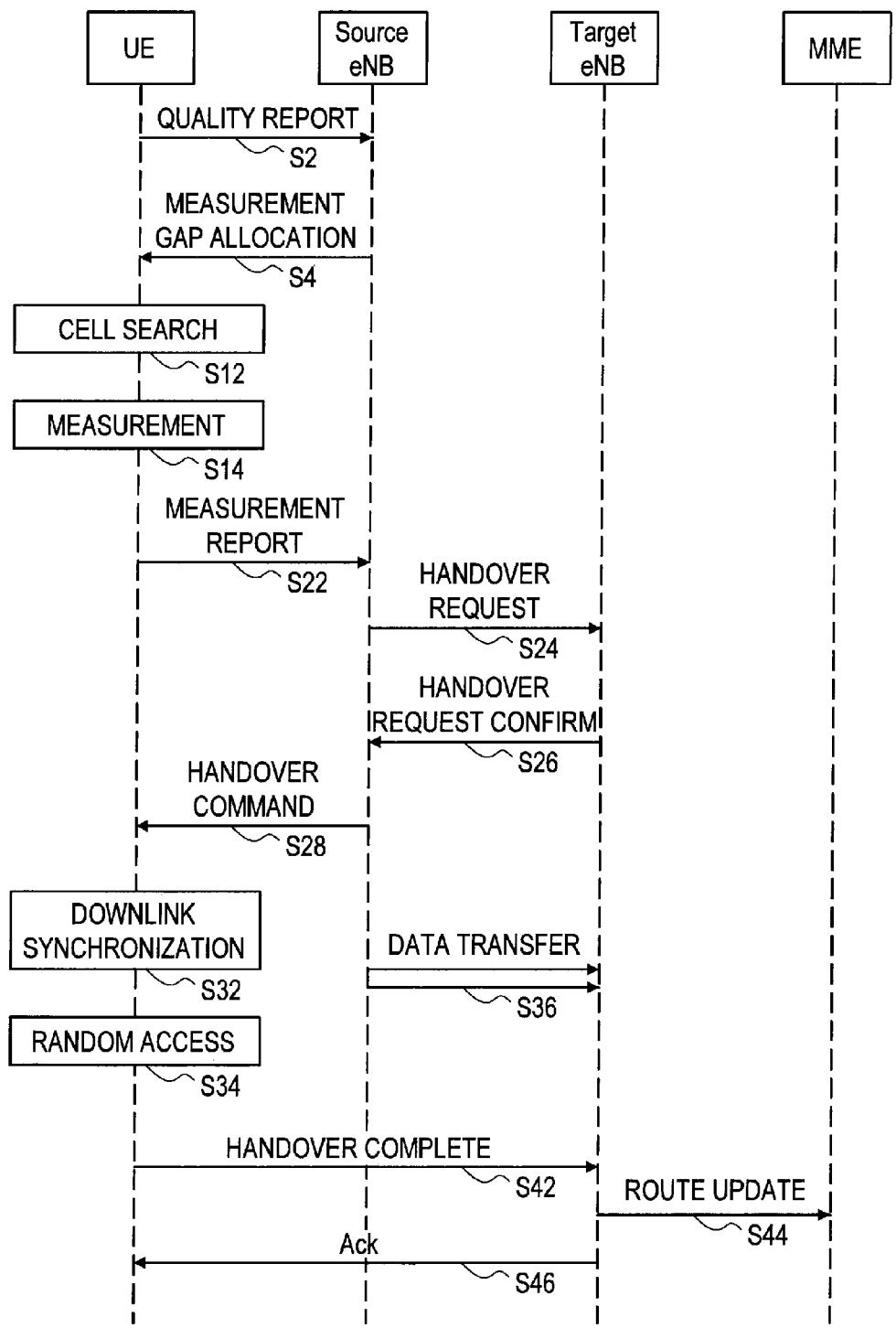
FIG. 1 is a sequence chart to describe a flow of a typical handover procedure.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Description of Related Art
   1-1. Handover Procedure
   1-2. Structure of Communication Resource
   1-3. Description of Issue
   2. Outline of Radio Communication System
   3. Description of First Embodiment
   3-1. Exemplary Configuration of User Equipment
   3-2. Exemplary Configuration of Base Station
   3-3. Flow of Process
   3-4. Summary of First Embodiment
   4. Description of Second Embodiment
   4-1. Exemplary Configuration of User Equipment
   4-2. Exemplary Configuration of Base Station
   4-3. Flow of Process
   4-4. Summary of Second Embodiment <1. Description of Related Art>
(1-1. Handover Procedure)

A technique related to the present invention is described hereinafter with reference to FIGS. 1 to 3. FIG. 1 shows a flow of a handover procedure in conformity with LTE in a radio communication not involving the carrier aggregation as an example of a typical handover procedure. In this example, a user equipment (UE), a source base station (source eNB), a target base station (target eNB), and a mobility management entity (MME) are involved in the handover procedure.

As a preliminary step toward a handover, the user equipment first reports the channel quality of a communication channel between the user equipment and the source base station to the source base station (step S2). The channel quality may be reported on a regular basis or when the channel quality falls below a predetermined reference value. The user equipment can measure the channel quality of the communication channel with the source base station by receiving a reference signal contained in a downlink channel from the source base station.

Then, the source base station determines the needs of measurement based on the quality report received from the user equipment and, if measurement is necessary, allocates measurement gaps to the user equipment (step S4).

Then, the user equipment searches for a downlink channel from a peripheral base station (i.e. performs cell search) during the periods of the allocated measurement gaps (step S12). Note that the user equipment can recognize a peripheral base station to search according to a list that is provided in advance from the source base station.

When the user equipment acquires synchronization with a downlink channel, the user equipment performs measurement by using a reference signal contained in the downlink channel (step S14). During this period, the source base station restricts an allocation of data communication related to the user equipment so as to avoid occurrence of data transmission by the user equipment.

Upon completion of the measurement, the user equipment transmits a measurement report containing measurements to the source base station (step S22). The measurements contained in the measurement report may be the average value or the central value of measured values over a plurality of times of measurement or the like. Further, the measurements may contain data about a plurality of frequency bands.

Receiving the measurement report, the source base station determines whether or not to execute a handover based on the contents of the measurement report. For example, when the channel quality of another base station in the periphery is higher than the channel quality of the source base station by a predetermined threshold or greater, it can be determined that a handover is necessary. In this case, the source base station determines to carry out a handover procedure with the relevant another base station as a target base station, and transmits a handover request message to the target base station (step S24).

Receiving the handover request message, the target base station determines whether it is possible to accept the user equipment according to the availability of a communication service offered by itself or the like. When it is possible to accept the user equipment, the target base station transmits a handover request confirm message to the source base station (step S26).

Receiving the handover request confirm message, the source base station transmits a handover command to the user equipment (step S28). Then, the user equipment acquires synchronization with the downlink channel of the target base station (step S32). After that, the user equipment makes a random access to the target base station by using a random access channel in a given time slot (step S34). During this period, the source base station forwards data addressed to the user equipment to the target base station (step S36). Then, after success in the random access, the user equipment transmits a handover complete message to the target base station (step S42).

Receiving the handover complete message, the target base station requests the MME to perform route update for the user equipment (step S44). Upon updating the route of user data by the MME, the user equipment becomes able to communicate with another device through a new base station (i.e. the target base station). Then, the target base station transmits acknowledgement to the user equipment (step S46). A series of handover procedure thereby ends.

(1-2. Structure of Communication Resource)

Figure 2:
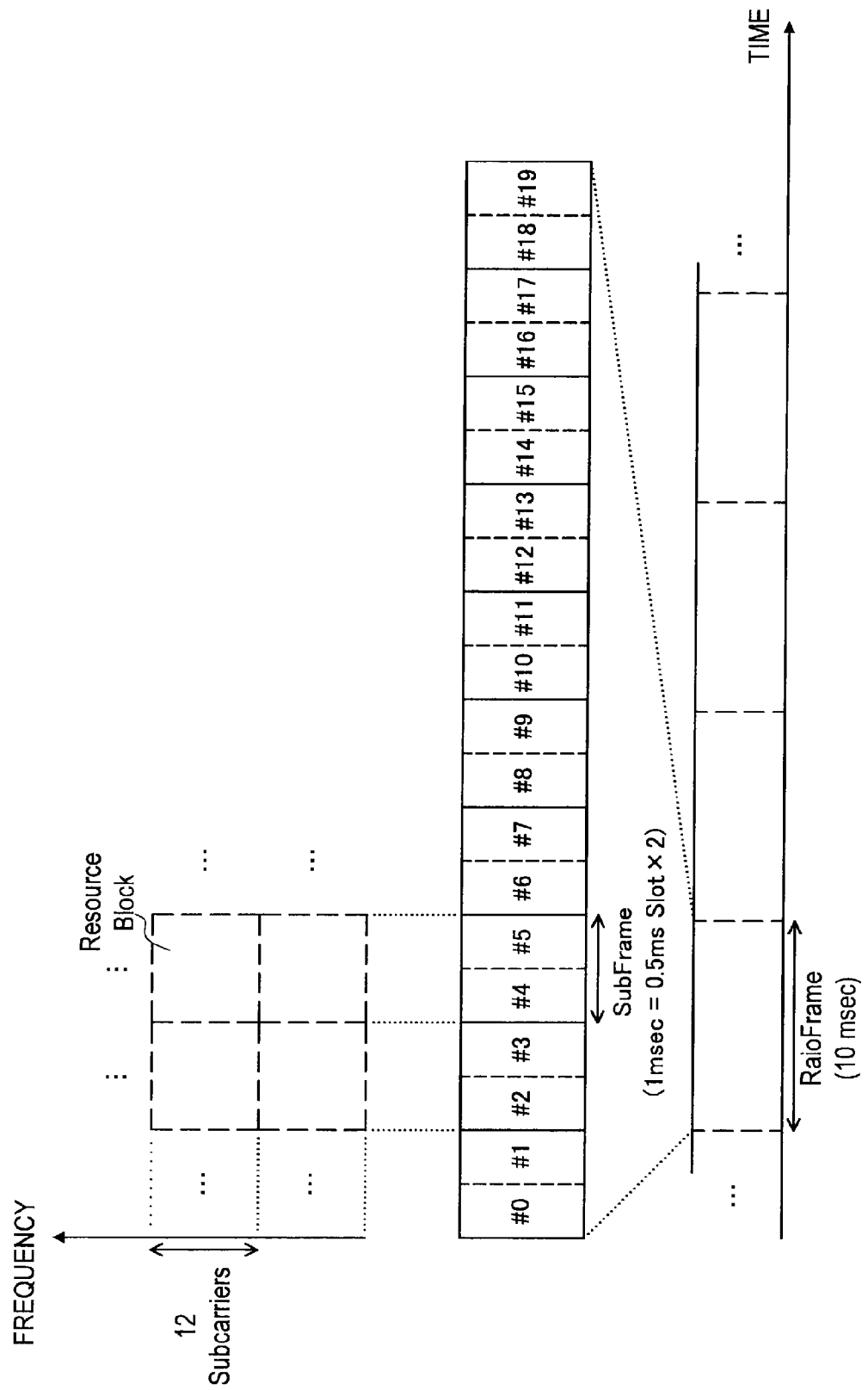
FIG. 2 is an explanatory view to describe an example of a structure of a communication resource.

FIG. 2 shows a structure of a communication resource in LTE as an example of a structure of a communication resource to which the present invention is applicable. Referring to FIG. 2, the communication resource in LTE is segmented in the time direction into radio frames each having a length of 10 msec. One radio frame includes ten sub-frames, and one sub-frame is made up of two 0.5 msec slots. In LTE, the sub-frame is one unit of an allocation of a communication resource to each user equipment in the time direction. Such one unit is called a resource block. One resource block includes twelve sub-carriers in the frequency direction. Specifically, one resource block has a size of 1 msec with 12 sub-carriers in the time-frequency domain. Throughput of data communication increases as a larger number of resource blocks are allocated for data communication on condition of the same bandwidth and time length. Further, in such a structure of a communication resource, a part of radio frame with a given frequency band is reserved as a random access channel. The random access channel can be used for an access to a base station by a user equipment that has changed from an idle mode to an active mode or an initial access to a target base station in a handover procedure, for example.

(1-3. Description of Issue)

An issue related to a handover procedure in a radio communication involving the carrier aggregation is described hereinafter with reference to FIG. 3. FIG. 3 is an explanatory view to describe a cyclic prefix length (which is referred to hereinafter as a CP length) that can be adopted generally in the structure of a communication resource which is described above with reference to FIG. 2.

A cyclic prefix length (CP) is a guard interval which is inserted between data symbols in order to avoid the occurrence of inter-symbol interference due to frequency selective fading caused by multipath delay spread over a communication channel. By inserting the cyclic prefix into data symbols, it is possible to avoid inter-symbol interference caused by delay spread up to the length of the inserted cyclic prefix.

Figure 3:
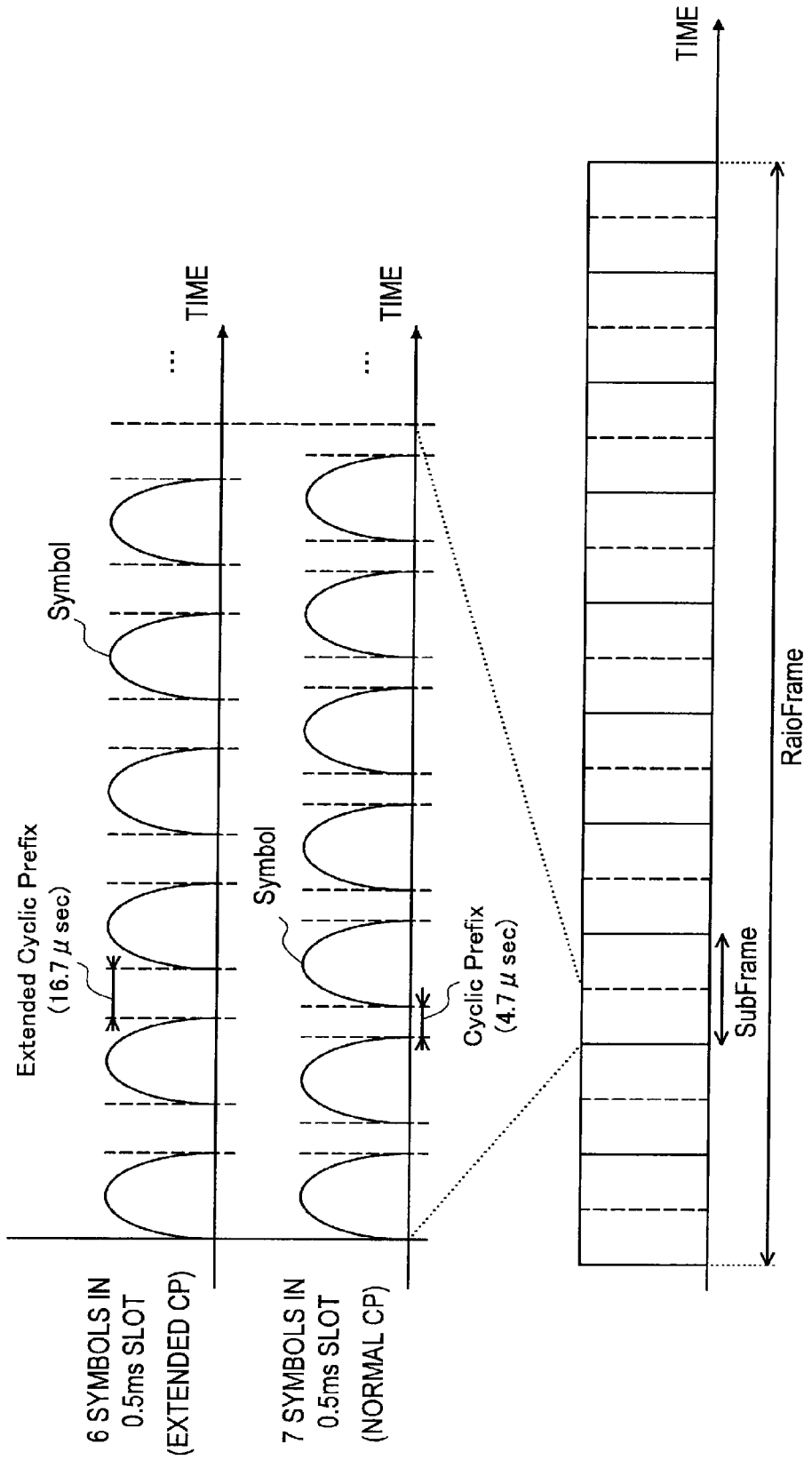
FIG. 3 is an explanatory view to describe a cyclic prefix length that can be adopted generally.

FIG. 3 shows two types of cyclic prefixes, an extended CP and a normal CP, by way of illustration. In the case of the extended CP, six symbols are included in the 0.5 ms slot which is described earlier with reference to FIG. 2. Further, the extended cyclic prefix having a length of 16.7 microsec is inserted between the symbols. On the other hand, in the case of the normal CP, seven symbols are included in the 0.5 ms slot. Further, the normal cyclic prefix having a length of 4.7 microsec is inserted between the symbols. The cyclic prefix typically contains a copy of the last portion of the data symbol.

Which of the extended CP or the normal CP is to be used is generally determined in each base station. Then, the type of cyclic prefix to be used is notified from a base station to a user equipment through a broadcast channel. In many cases, the extended CP is used in the place where the multipath delay spread is particularly large. However, because the use of the extended CP leads to an increase in overhead, throughput decreases when using the extended CP compared to when using the normal CP. Thus, there is a possibility that the extended CP and the normal CP are used in the base stations which are adjacent to each other, depending on the effect of the multipath delay spread.

In a handover in a radio communication not involving the carrier aggregation, the user equipment can switch the setting of the CP length of the radio communication unit at the point of synchronization or a random access to the target base station. However, in a handover in a radio communication involving the carrier aggregation, the situation occurs where a handover is completed for only a part of a plurality of component carriers. If, in view of such a situation, a circuit for simultaneously handling different CP lengths is applied in the radio communication unit, disadvantages occur such as complication of the circuit, an increase in manufacturing cost and an increase in processing load. Therefore, it is effective to employ the technique that can avoid simultaneous handling of different CP lengths during a handover procedure as in two embodiments of the present invention which are described in detail below.

<2. Outline of Radio Communication System>

Figure 4:
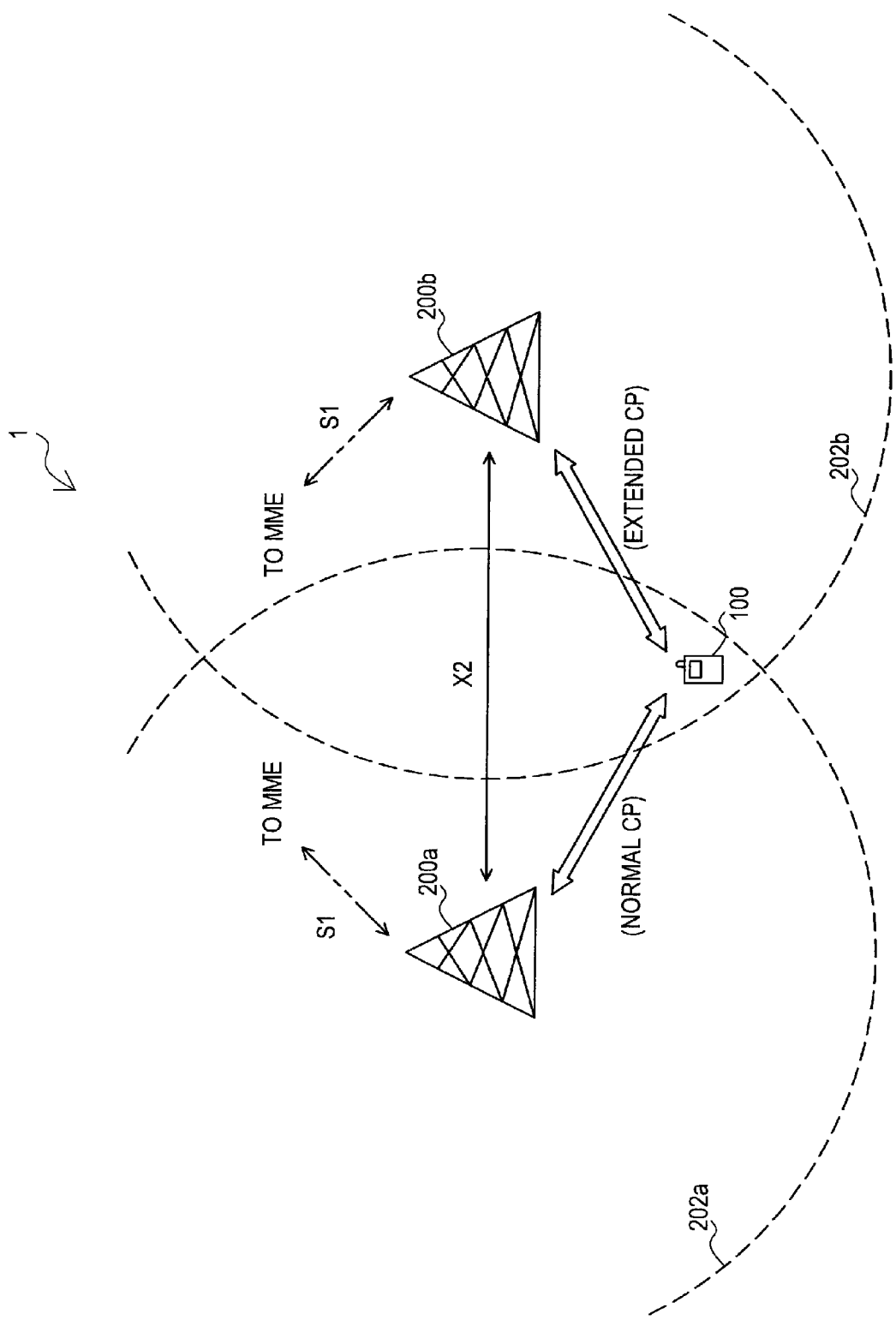
FIG. 4 is a schematic view showing an outline of a radio communication system according to an embodiment.

FIG. 4 is a schematic view showing an outline of a radio communication system 1 according to an embodiment of the present invention. Referring to FIG. 4, the radio communication system 1 includes a user equipment 100, a base station 200a and a base station 200b. It is assumed that the base station 200a is a serving base station for the user equipment 100.

The user equipment 100 is located inside a cell 202a where a radio communication service is provided by the base station 200a. The user equipment 100 can perform a data communication with another user equipment (not shown) via the base station 200a over a communication channel formed by aggregating a plurality of component carriers (i.e. by carrier aggregation). However, because the distance between the user equipment 100 and the base station 200a is not short, there is a possibility that a handover is required for the user equipment 100. Further, the user equipment 100 is located inside a cell 202b where a radio communication service is provided by the base station 200b. Therefore, the base station 200b can be a candidate for a target base station for a handover of the user equipment 100.

Further, it is assumed for example that the base station 200a uses the CP length of the normal CP and the base station 200b uses the CP length of the extended CP, which are described earlier with reference to FIG. 3. Therefore, in order for the user equipment 100 to carry out a handover from the base station 200a to the base station 200b, it is necessary to change the setting of the CP length in the equipment at some point in time during a handover procedure.

The base station 200a can communicate with the base station 200b through a backhaul link (e.g. X2 interface). Various kinds of messages in the handover procedure as described with reference to FIG. 1, scheduling information related to the user equipment belonging to each cell or the like, for example, can be transmitted and received between the base station 200a and the base station 200b. Further, the base station 200a and the base station 200b can communicate with the MME, which is an upper node, through Si interface, for example.

It should be noted that, when there is no particular need to distinguish between the base station 200a and the base station 200b in the following description of the specification, they are collectively referred to as a base station 200 by omitting the alphabetical letter at the end of the reference symbol. The same applies to the other elements.

<3. Description of First Embodiment>

A first embodiment of the present invention for avoiding simultaneous handling of different CP lengths during a handover procedure in a radio communication involving the carrier aggregation is described hereinafter with reference to FIGS. 5 to 9.

(3-1. Exemplary Configuration of User Equipment)

Figure 5:
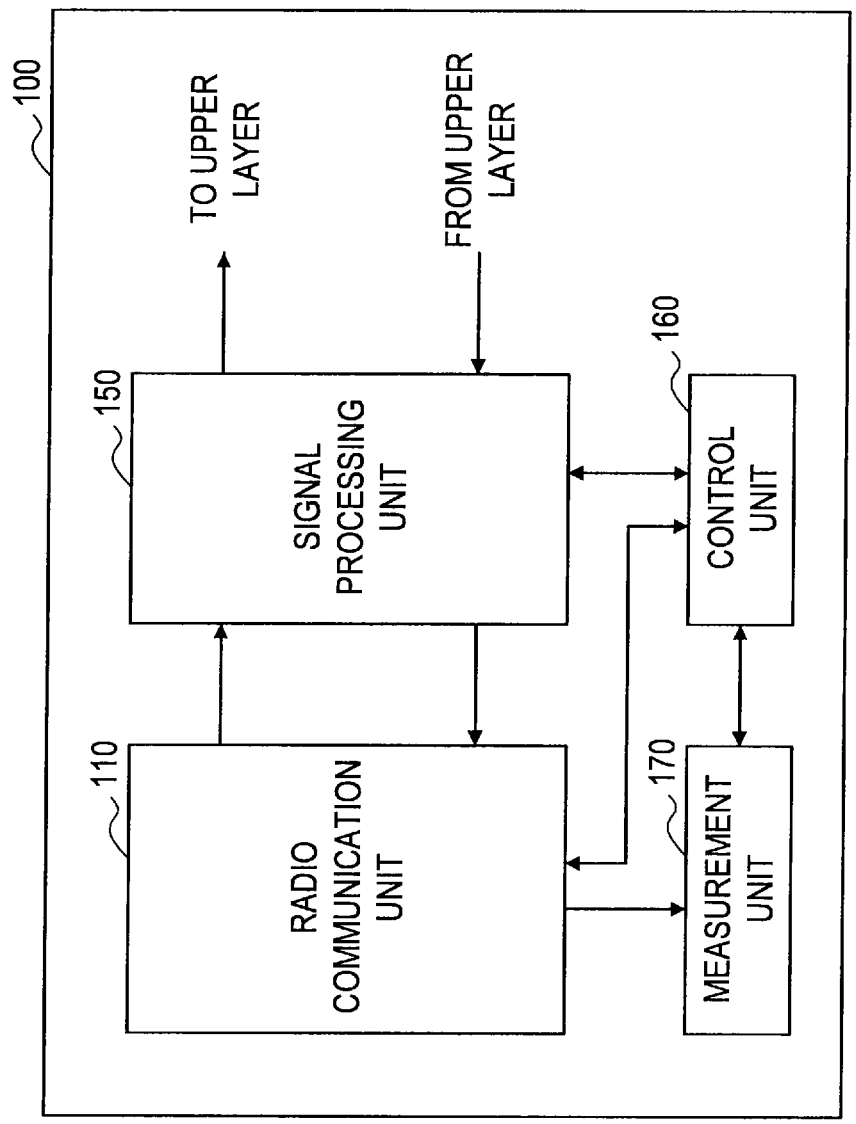
FIG. 5 is a block diagram showing an example of a configuration of a user equipment according to a first embodiment.

FIG. 5 is a block diagram showing an example of a configuration of the user equipment 100 according to the embodiment. Referring to FIG. 5, the user equipment 100 includes a radio communication unit 110, a signal processing unit 150, a buffer 152, a control unit 160, and a measurement unit 170.

(Radio communication unit)

The radio communication unit 110 performs a radio communication with the base station 200 over a communication channel formed by aggregating a plurality of component carriers with use of the carrier aggregation technology.

Figure 6:
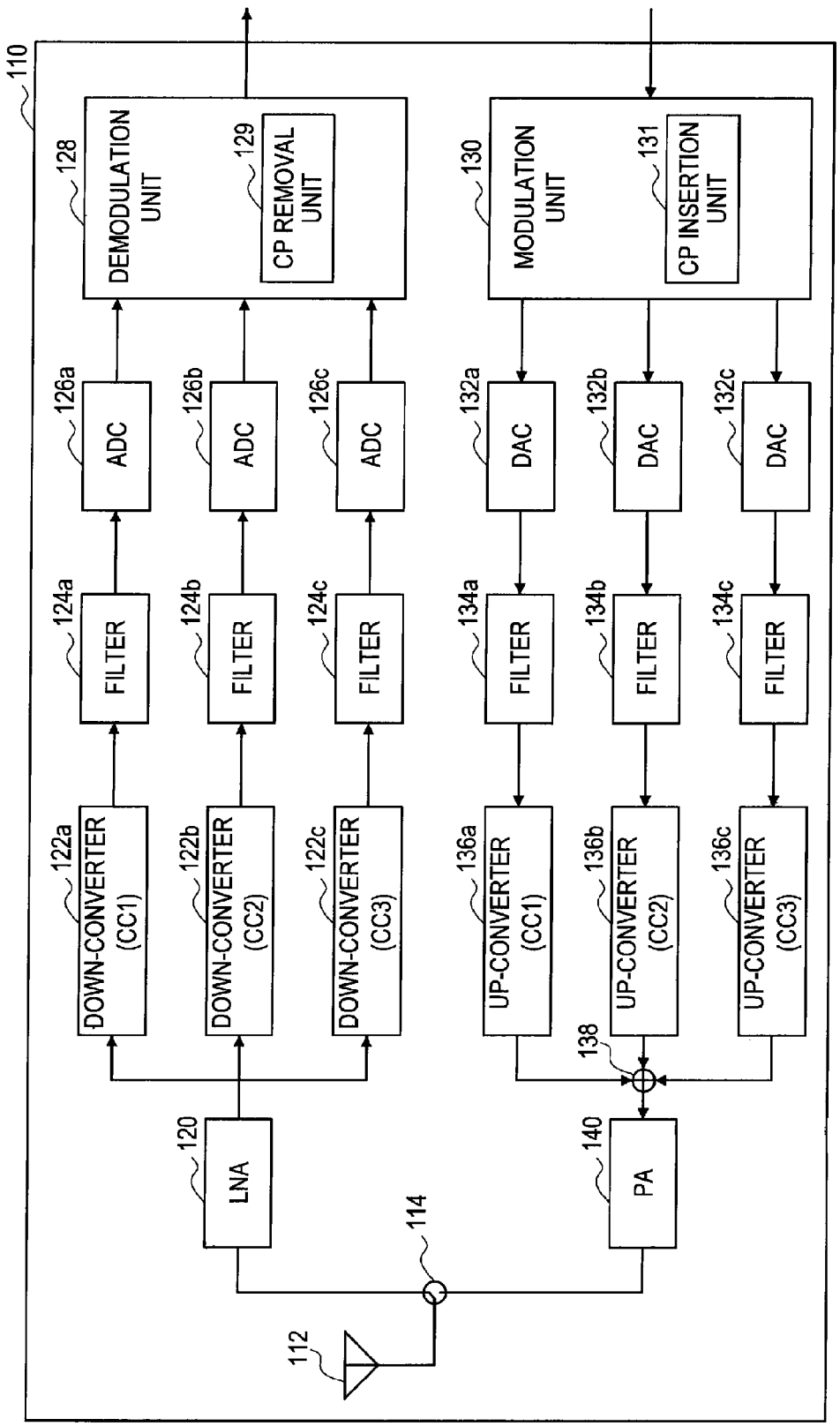
FIG. 6 is a block diagram showing an example of a detailed configuration of a radio communication unit according to the first embodiment.

FIG. 6 is a block diagram showing an example of a more detailed configuration of the radio communication unit 110. Referring to FIG. 6, the radio communication unit 110 includes an antenna 112, a switch 114, a low noise amplifier (LNA) 120, a plurality of down-converters 122a to 122c, a plurality of filters 124a to 124c, a plurality of analogue-to-digital converters (ADCs) 126a to 126c, a demodulation unit 128, a modulation unit 130, a plurality of digital-to-analogue converters (DACs) 132a to 132c, a plurality of filters 134a to 134c, a plurality of up-converters 136a to 136c, a combiner 138, and a power amplifier (PA) 140. Further, the demodulation unit 128 includes a CPU removal unit 129. The modulation unit 130 includes a CPU insertion unit 131.

The antenna 112 receives a radio signal transmitted from the base station 200 and outputs the received signal to the LNA 120 through the switch 114. The LNA 120 amplifies the received signal. The down-converter 122a and the filter 124a separate a baseband signal of the first component carrier (CC1) from the received signal amplified by the LNA 120. Then, the separated baseband signal is converted to a digital signal by the ADC 126a and output to the demodulation unit 128. Likewise, the down-converter 122b and the filter 124b separate a baseband signal of the second component carrier (CC2) from the received signal amplified by the LNA 120. Then, the separated baseband signal is converted to a digital signal by the ADC 126b and output to the demodulation unit 128. Further, the down-converter 122c and the filter 124c separate a baseband signal of the third component carrier (CC3) from the received signal amplified by the LNA 120. Then, the separated baseband signal is converted to a digital signal by the ADC 126c and output to the demodulation unit 128. After that, in the demodulation unit 128, the CPU removal unit 129 removes a cyclic prefix from the baseband signals of the respective component carriers. The demodulation unit 128 then generates a data signal by demodulating the baseband signals and outputs the data signal to the signal processing unit 150.

Further, when a data signal is input from the signal processing unit 150, the modulation unit 130 modulates the data signal and generates baseband signals of the respective component carriers. Further, in the modulation unit 130, the CP insertion unit 131 inserts a cyclic prefix to the baseband signals. Among those baseband signals, the baseband signal of the first component carrier (CC1) is converted to an analog signal by the DAC 132a. Then, a frequency component corresponding to the first component carrier in a transmission signal is generated from the analog signal by the filter 134a and the up-converter 136a. Likewise, the baseband signal of the second component carrier (CC2) is converted to an analog signal by the DAC 132b. Then, a frequency component corresponding to the second component carrier in the transmission signal is generated from the analog signal by the filter 134b and the up-converter 136b. Further, the baseband signal of the third component carrier (CC3) is converted to an analog signal by the DAC 132c. Then, a frequency component corresponding to the third component carrier in the transmission signal is generated from the analog signal by the filter 134c and the up-converter 136c. After that, the generated frequency components corresponding to the three component carriers are combined by the combiner 138, and the transmission signal is formed. The PA 140 amplifiers the transmission signal and outputs the transmission signal to the antenna 112 through the switch 114. Then, the antenna 112 transmits the transmission signal as a radio signal to the base station 200.

Although the case where the radio communication unit 110 handles three component carriers is described in FIG. 6, the number of component carriers handled by the radio communication unit 110 may be two, or four or more.

Further, instead of processing the signals of the respective component carriers in the analog region as in the example of FIG. 6, the radio communication unit 110 may process the signals of the respective component carriers in the digital region. In the latter case, at the time of reception, a digital signal converted by one ADC is separated into the signals of the respective component carriers by a digital filter. Further, at the time of transmission, after digital signals of the respective component carriers are frequency-converted and combined, the signal is converted into an analog signal by one DAC. The load of the ADC and the DAC is generally smaller when processing the signals of the respective component carriers in the analog region. On the other hand, when processing the signals of the respective component carriers in the digital region, a sampling frequency for AD/DA conversion is higher, and the load of the ADC and the DAC can thereby increase.

(Signal processing unit)

Referring back to FIG. 5, an example of a configuration of the user equipment 100 is further described below.

The signal processing unit 150 performs signal processing such as deinterleaving, decoding or error correction on the demodulated data signal that is input from the radio communication unit 110. Then, the signal processing unit 150 outputs the processed data signal to an upper layer. Further, the signal processing unit 150 performs signal processing such as encoding or interleaving on the data signal that is input from the upper layer. Then, the signal processing unit 150 outputs the processed data signal to the radio communication unit 110.

(Control unit)

The control unit 160 controls the overall functions of the user equipment 100 by using a processing device such as a central processing unit (CPU) or a digital signal processor (DSP). For example, the control unit 160 controls the timing of data communication by the radio communication unit 110 according to scheduling information that is received from the base station 200 by the radio communication unit 110. Further, the control unit 160 controls the measurement unit 170 to measure the channel quality by using a reference signal from the base station 200, which is a serving base station, and transmits the channel quality report to the base station 200 through the radio communication unit 110. Further, the control unit 160 controls the measurement unit 170 to execute measurement during the periods of measurement gaps which are allocated by the base station 200.

Further, in this embodiment, before a handover command from the source base station is received, the control unit 160 acquires the CP length being used by the target base station by receiving system information from the relevant target base station. The system information is delivered through a broadcast channel which is placed in a prescribed position in the radio frame, for example. Then, at the time of a handover, the control unit 160 controls the radio communication unit 110 to initiate a random access to the target base station after all of handover commands for all of the plurality of component carriers are received from the source base station by the radio communication unit 110. Further, at the initiation of a random access to the target base station, for example, the control unit 160 changes the setting of the CP length in the radio communication unit 110 to the CP length being used by the target base station.

Note that, when the CP length being used by the source base station and the CP length being used by the target base station are equal, the control unit 160 may control the radio communication unit 110 to initiate a random access to the target base after receiving a handover command for any of the component carriers, without waiting for handover commands for the other component carriers. In this case, the control unit 160 does not need to change the setting of the CP length in the radio communication unit 110.

(Measurement unit)

The measurement unit 170 measures the channel quality for each of the component carriers by using a reference signal from the base station 200 according to control from the control unit 160, for example. Further, the measurement unit 170 executes measurement for a handover with respect to each of the component carriers by using the measurement gaps which are allocated by the base station 200. A result of the measurement executed by the measurement unit 170 is converted to a predetermined format for a measurement report by the control unit 160 and transmitted to the base station 200 through the radio communication unit 110. After that, the base station 200 determines, based on the measurement report, whether a handover should be executed or not for the user equipment 100.

(3-2. Exemplary Configuration of Base Station)

Figure 7:
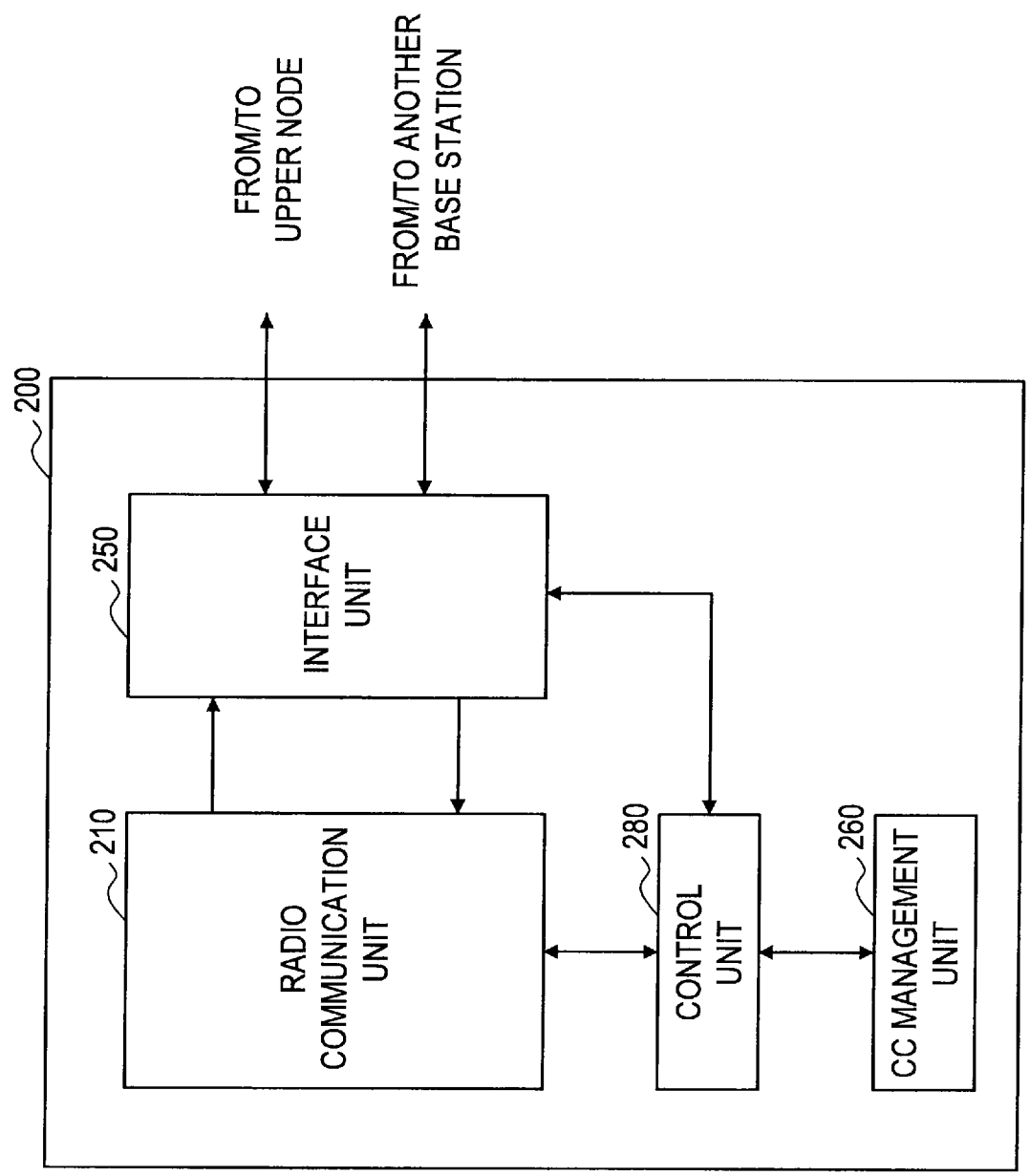
FIG. 7 is a block diagram showing an example of a configuration of a base station according to the first embodiment.

FIG. 7 is a block diagram showing an example of a configuration of the base station 200 according to the embodiment. Referring to FIG. 7, the base station 200 includes a radio communication unit 210, an interface unit 250, a component carrier (CC) management unit 260, and a control unit 280.

(Radio communication unit)

A specific configuration of the radio communication unit 210 may be similar to the configuration of the radio communication unit 110 of the user equipment 100 which is described above with reference to FIG. 6, although the number of component carriers to be supported, the requirements of processing performance or the like are different. The radio communication unit 210 performs a radio communication with the user equipment over a communication channel which is formed by aggregating a plurality of component carriers with use of the carrier aggregation technology.

(Interface Unit)

The interface unit 250 mediates a communication between the radio communication unit 210 or the control unit 280 and an upper node through the S1 interface illustrated in FIG. 4, for example. Further, the interface unit 250 mediates a communication between the radio communication unit 210 or the control unit 280 and another base station through the X2 interface illustrated in FIG. 4, for example.

(CC Management Unit)

The CC management unit 260 holds data that indicates which component carrier each user equipment is using for communication with respect to each of the user equipments belonging to the cell of the base station 200. Such data can be updated by the control unit 280 when an additional user equipment joins the cell of the base station 200 or when the existing user equipment changes its component carriers. Thus, the control unit 280 can recognize which component carrier the user equipment 100 is using by referring to the data held by the CC management unit 260.

(Control Unit)

The control unit 280 controls the overall functions of the base station 200 by using a processing device such as a CPU or a DSP. For example, the control unit 280 allocates communication resources for data communication to the user equipment 100 and other user equipments and then delivers scheduling information over a broadcast channel in a given sub-frame. Further, the control unit 280 delivers other system information over the broadcast channel, for example. The system information contains the set value of the CP length being used by the base station 200, for example. Further, the control unit 280 controls the base station 200 to operate in the same manner as the source base station or the target base station in the handover procedure which is descried with reference to FIG. 1.

(3-3. Flow of Process)

A handover procedure according to the embodiment is described hereinafter with reference to FIGS. 8A and 8B. Note that, in the following scenario, it is assumed that a handover procedure is performed among the user equipment 100, the base station 200a serving as a source base station, and the base station 200b serving as a target base station. Further, for simplification of description, it is assumed in this scenario that the user equipment 100 performs a radio communication by using two component carriers. Furthermore, for the procedure up to measurement in the user equipment (steps S2 to S14) in the typical handover procedure illustrated in FIG. 1, explanation is omitted because there is no significant difference.

Figure 8A:
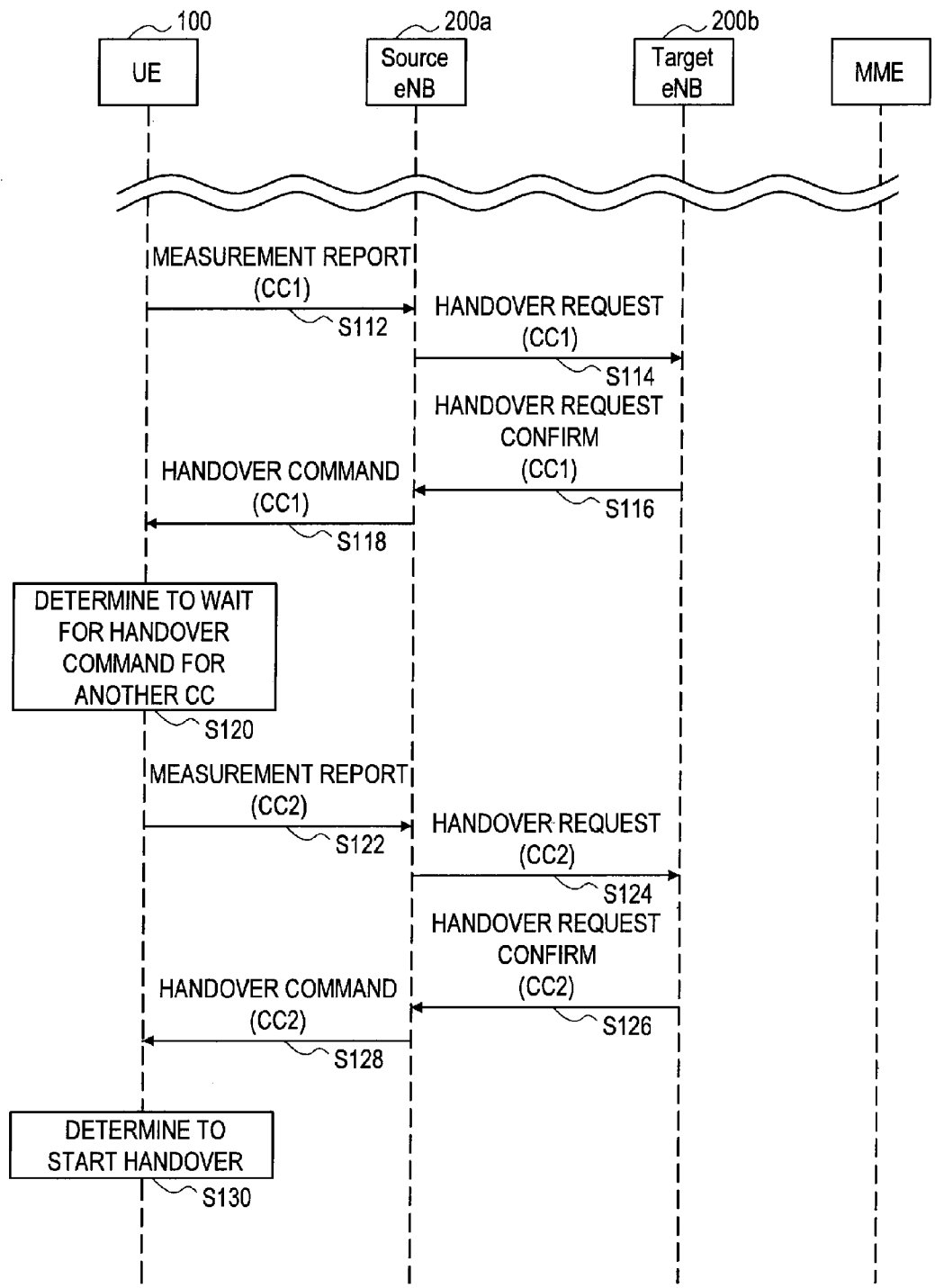
FIG. 8A is the first half of a sequence chart showing an example of a flow of a handover procedure according to the first embodiment.

Referring to FIG. 8A, the user equipment 100 first transmits a measurement report for the component carrier CC1, for example, to the base station 200a (step S112). Receiving the measurement report, the base station 200a determines the necessity of a handover based on the measurement report. For example, when a channel quality between the user equipment 100 and the base station 200b is better than a channel quality between the user equipment 100 and the base station 200a by a predetermined threshold or greater, it can be determined that a handover is necessary. In this case, the base station 200a transmits a handover request message for the component carrier CC1 to the base station 200b (step S114). Receiving the handover request message, the base station 200b determines whether it is possible to accept the user equipment 100 according to the availability of a communication service offered by itself or the like. When the base station 200b determines that it is possible to accept the user equipment 100, the base station 200b transmits a handover request confirm message to the base station 200a (step S116). Receiving the handover request confirm message, the base station 200a transmits a handover command for the component carrier CC1 to the user equipment 100 (step S118).

Up to this point of time, the user equipment 100 acquires the CP length being used by the base station 200b by receiving system information from the base station 200b (for example, the system information may be received during execution of the measurement). For example, the CP length being used by the base station 200b is the CP length of the extended CP. On the other hand, the CP length being used by the base station 200a is the CP length of the normal CP. In this case, the user equipment 100 which has received a handover command from the base station 200a determines to wait until a handover command for another component carrier (i.e. CC2) is received, without initiating a handover (S120).

Further, the user equipment 100 transmits a measurement report for the component carrier CC2 to the base station 200a (step S122). Then, the base station 200a transmits a handover request message for the component carrier CC2 to the base station 200b (step S124). Receiving the handover request message, the base station 200b transmits a handover request confirm message to the base station 200a (step S126). Receiving the handover request confirm message, the base station 200a transmits a handover command for the component carrier CC2 to the user equipment 100 (step S128).

When the step S128 ends, handover commands for all of the plurality of component carriers constituting the communication channel between the user equipment 100 and the base station 200a have been received by the user equipment 100. As a result, the user equipment 100 determines to initiate a handover (step S130).

Figure 8B:
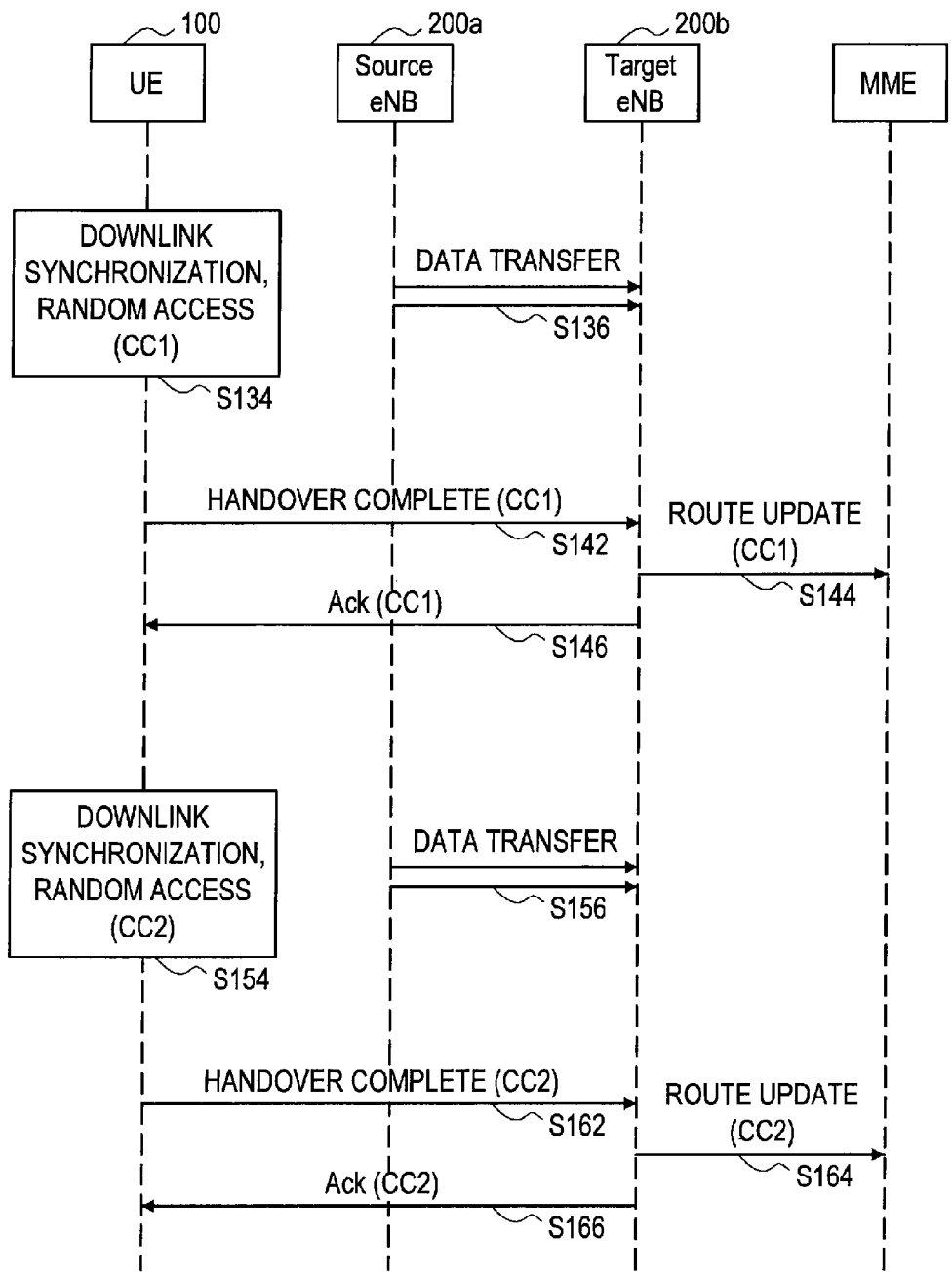
FIG. 8B is the second half of a sequence chart showing an example of a flow of a handover procedure according to the first embodiment.

Referring to FIG. 8B, the user equipment 100 which has determined the initiation of a handover first acquires synchronization with the downlink channel of the component carrier CC1 of the base station 200b. Then, the user equipment 100 makes a random access to the base station 200b by using a random access channel in a given time slot of the component carrier CC1 (step S134). During this period, the base station 200a forwards data addressed to the user equipment 100 to the base station 200b (step S136). Then, after success in the random access for the component carrier CC1, the user equipment 100 transmits a handover complete message to the base station 200b (step S142). Receiving the handover complete message, the base station 200b requests the MME to perform route update for the component carrier CC1 of the user equipment 100 (step S144). Upon updating the route of user data by the MME, the user equipment 100 becomes able to communicate with another device through a new base station (i.e. the base station 200b). Note that the request for route update may be performed for each of the plurality of component carriers, or performed only once for the plurality of component carriers. Then, the base station 200b transmits acknowledgement for the handover complete message to the user equipment 100 (step S146).

Further, the user equipment 100 acquires synchronization with the downlink channel of the component carrier CC2 of the base station 200b. Then, the user equipment 100 makes a random access to the base station 200b by using a random access channel in a given time slot of the component carrier CC2 (step S154). During this period, the base station 200a keeps forwarding data addressed to the user equipment 100 to the base station 200*b* (step S156). Then, after success in the random access for the component carrier CC2, the user equipment 100 transmits a handover complete message to the base station 200*b* (step S162). Receiving the handover complete message, the base station 200*b* requests the MME to perform route update for the component carrier CC2 of the user equipment 100 (step S164). Then, the base station 200*b* transmits acknowledgement for the handover complete message to the user equipment 100 (step S166).

Figure 9:
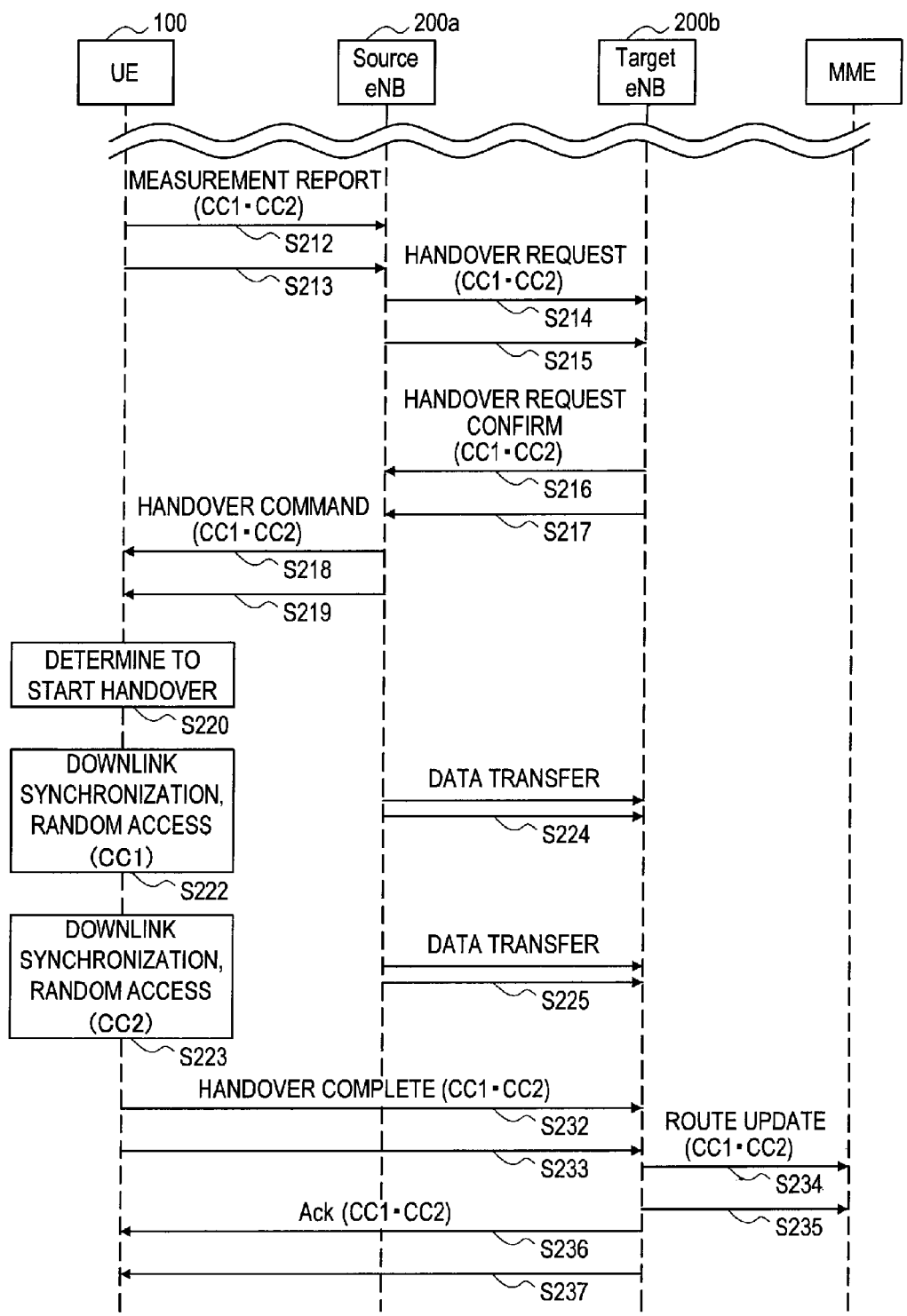
FIG. 9 is a sequence chart showing another example of a flow of a handover procedure according to the first embodiment.

It should be noted that, except that the user equipment 100 should initiate a random access after receiving handover commands for all of the component carriers, the respective steps in the scenario illustrated in FIG. 8A and FIG. 8B may be executed in a different sequence. FIG. 9 is a sequence chart showing another example of a flow of a handover procedure according to the embodiment.

Referring to FIG. 9, the user equipment 100 first transmits a measurement report for the component carrier CC1 to the base station 200*a* (step S212). Further, the user equipment 100 first transmits a measurement report for the component carrier CC2 to the base station 200*a* (step S213). Note that those measurement reports may be integrated.

Receiving the measurement reports, the base station 200*a* determines the necessity of a handover based on the measurement report. When the base station 200*a* determines that a handover is necessary, the base station 200*a* first transmits a handover request message for the component carrier CC1 to the base station 200*b* (step S214). The base station 200*a* then transmits a handover request message for the component carrier CC2 to the base station 200*b* (step S215).

Receiving the handover request messages, the base station 200*b* determines whether it is possible to accept the user equipment 100 according to the availability of a communication service offered by itself or the like. When the base station 200*b* determines that it is possible to accept the user equipment 100, the base station 200*b* first transmits a handover request confirm message for the component carrier CC1 to the base station 200*a* (step S216). The base station 200*b* then transmits a handover request confirm message for the component carrier CC2 to the base station 200*a* (step S217).

Receiving the handover request confirm messages, the base station 200*a* transmits a handover command for the component carrier CC1 to the user equipment 100 (step S218). Further, the base station 200*a* transmits a handover command for the component carrier CC2 to the user equipment 100 (step S219).

Receiving the handover command for the component carrier CC1, the user equipment 100 waits until the handover command for the component carrier CC2 is received. Then, when the user equipment 100 receives the handover command for the component carrier CC2, it determines to initiate a handover (step S220).

The, the user equipment 100 first acquires synchronization with the downlink channel of the component carrier CC1 of the base station 200*b*. Further, the user equipment 100 makes a random access to the base station 200*b* by using a random access channel in a given time slot of the component carrier CC1 (step S222). Then, the user equipment 100 acquires synchronization with the downlink channel of the component carrier CC2 of the base station 200*b*. Further, the user equipment 100 makes a random access to the base station 200*b* by using a random access channel in a given time slot of the component carrier CC2 (step S223). During this period, the base station 200*a* forwards data addressed to the user equipment 100 to the base station 200*b* (steps S224, S225).

After that, upon success in the random access for the component carrier CC1, the user equipment 100 transmits a handover complete message for the component carrier CC1 to the base station 200*b* (step S232). Further, upon success in the random access for the component carrier CC2, the user equipment 100 transmits a handover complete message for the component carrier CC2 to the base station 200*b* (step S233). Receiving the handover complete messages, the base station 200*b* requests the MME to perform route update for the component carriers CC1 and CC2 of the user equipment 100 (steps S234, S235). Then, the base station 200*b* transmits acknowledgements for the respective handover complete messages to the user equipment 100 (steps S236, S237).

(3-4. Summary of First Embodiment) The first embodiment of the present invention is described above with reference to FIGS. 5 to 9. According to the embodiment, the control unit 160 of the user equipment 100 initiates a random access to the target base station by the radio communication unit 110 after receiving handover commands for all of the plurality of component carriers constituting the communication channel. In this case, a situation does not occur where the user equipment performs a communication with the source base station in a certain component carrier and also performs a communication with the target base station in another component carrier at the same time. It is thereby possible to avoid the user equipment 100 from simultaneously handing different CP lengths during a handover procedure.

Further, when the CP length being used by the source base station and the CP length being used by the target base station are equal, the user equipment 100 may initiate a random access soon after receiving a handover command for any of the component carriers, without waiting for a handover command for the other component carrier. It is thereby possible to complete a handover promptly for the component carrier for which a handover request is confirmed when it is not necessary to switch the CP length.

Furthermore, the user equipment 100 may acquire the CP length being used by the target base station by using the system information which is broadcasted from the relevant target base station. The user equipment 100 may receive the system information which is broadcasted from the target base station at the time of measurement, for example. This configuration eliminates the need for exchanging an additional message for determination about waiting for a random access depending on the CP length, and it is thereby possible to reduce the impact on the existing system.

<4. Description of Second Embodiment>

A second embodiment of the present invention for avoiding simultaneous handling of different CP lengths during a handover procedure in a radio communication involving the carrier aggregation is described hereinafter with reference to FIGS. 10 to 14.

In the second embodiment of the present invention, communication resources are scheduled in such a way that the user equipment can perform a radio communication with the source base station and the target base station by switching the CP length in time division during a handover procedure.

Figure 10:
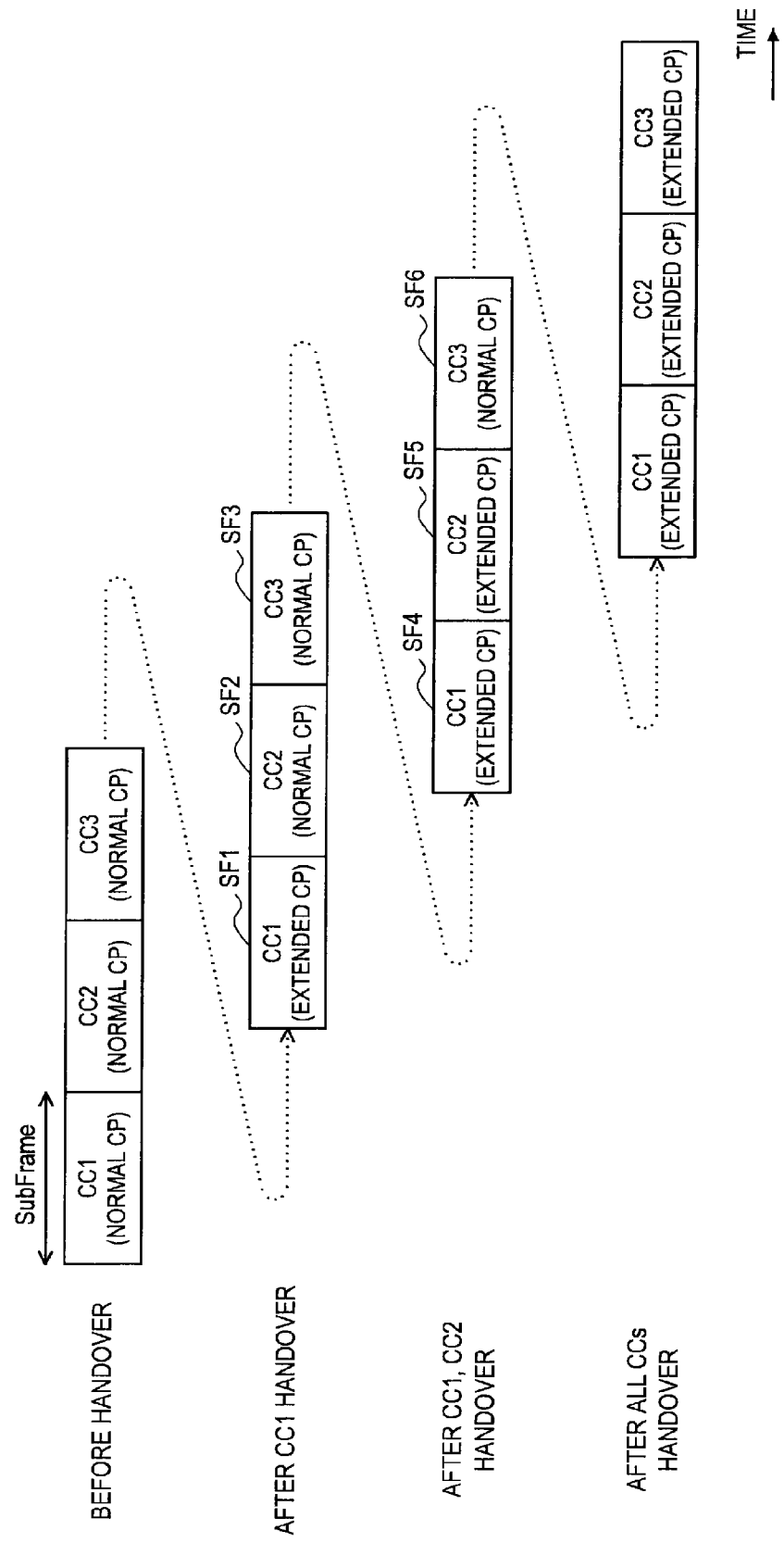
FIG. 10 is an explanatory view to describe an outline of switching of a cyclic prefix length in time division.

FIG. 10 is an explanatory view to describe an outline of switching of a cyclic prefix length in time division.

Referring to FIG. 10, as a result that a handover is executed sequentially for three component carriers CC1 to CC3, a series of handover procedure can be divided into four stages. The first stage is before a handover. At the first stage, all component carriers are connected to the source base station. The second stage is after a handover of the component carrier CC1. At the second stage, the component carrier CC1 is connected to the target base station, and the component carriers CC2 and CC3 are connected to the source base station. The third stage is after a handover of the component carriers CC1 and CC2. At the third stage, the component carriers CC1 and CC2 are connected to the target base station, and the component carrier CC3 is connected to the source base station. The fourth stage is after a handover of all the component carriers. At the fourth stage, all component carriers are connected to the target base station.

Among those stages, at the first stage, because all component carriers are connected to the source base station, the user equipment can use the same CP length (e.g. the normal CP) at any point of time. Thus, the source base station can allocate communication resources for each component carrier without depending on the CP length. Likewise, at the fourth stage, because all component carriers are connected to the target base station, the user equipment can use the same CP length (e.g. the extended CP) at any point of time. Thus, the target base station can allocate communication resources for each component carrier without depending on the CP length.

On the other hand, at the second stage and the third stage, a part of a plurality of component carriers is connected to the target base station, and the rest is connected to the source base station. In this case, a communication resource is allocated only for any one component carrier with respect to each sub-frame by the source base station and the target base station, for example. For example, in the example of FIG. 10, at the second stage, a communication resource of the sub-frame SF1 is allocated for the component carrier CC1, a communication resource of the sub-frame SF2 is allocated for the component carrier CC2, and a communication resource of the sub-frame SF3 is allocated for the component carrier CC3. Further, at the third stage, a communication resource of the sub-frame SF4 is allocated for the component carrier CC1, a communication resource of the sub-frame SF5 is allocated for the component carrier CC2, and a communication resource of the sub-frame SF6 is allocated for the component carrier CC3. Such an allocation of communication resources can be achieved by exchanging scheduling information between the source base station and the target base station through a backhaul link, for example.

As described above, in this embodiment, a communication resource is allocated only for any one component carrier with respect to each sub-frame. In this case, even when the CP lengths to be used are different between the source base station and the target base station, the user equipment can communicate with the respective base stations in time division by changing the setting of the CP length with respect to each sub-frame. Changing the CP length to use with respect to each subframe during a handover procedure results in avoiding simultaneous handling of different cyclic prefix lengths in one user equipment.

Note that, in such scheduling, it is preferred to set the ratio (ratio in a given time window) of the amount of communication resource allocated for a part of component carrier for which a handover is completed and the amount of communication resource allocated for the rest of the component carriers to be substantially the same as the radio of the number of component carriers between the former and the latter. In the example of FIG. 10, the ratio of the amount of communication resources at the second stage is 1:2 (after: before handover). Further, the ratio of the amount of communication resources at the third stage is 2:1 (after:before handover). According to such scheduling, it is possible to share traffic among a plurality of component carriers in the case of allocating a communication resource only for any one component carrier with respect to each sub-frame.

The configurations of a user equipment 300 and a base station 400 according to the embodiment for achieving the above-described switching of the SP length in time division during a handover procedure are specifically described hereinbelow.

(4-1. Exemplary Configuration of User Equipment)

Figure 11:
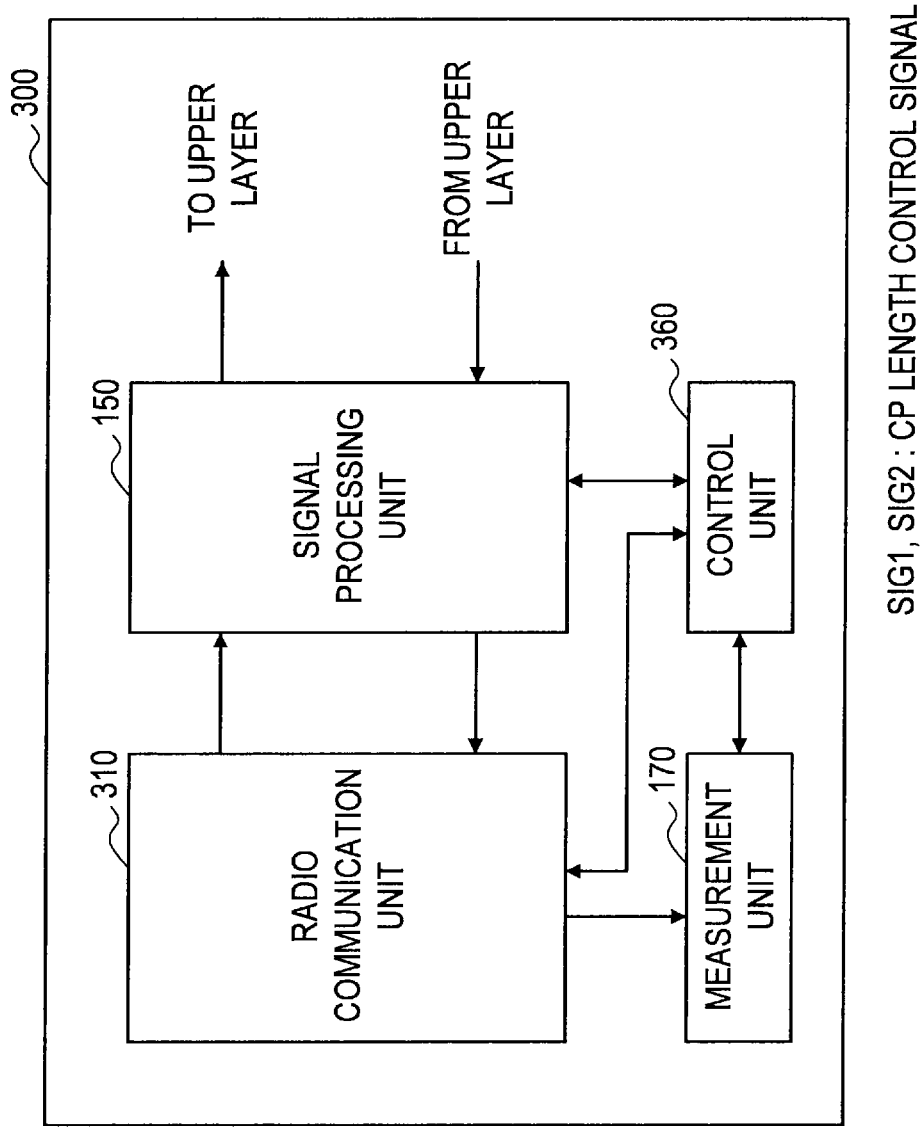
FIG. 11 is a block diagram showing an example of a configuration of a user equipment according to a second embodiment.

FIG. 11 is a block diagram showing an example of a configuration of the user equipment 300 according to the embodiment. Referring to FIG. 11, the user equipment 300 includes a radio communication unit 310, a signal processing unit 150, a control unit 360, and a measurement unit 170.

(Radio Communication Unit)

The radio communication unit 310 performs a radio communication with the base station 400 over a communication channel formed by aggregating a plurality of component carriers with use of the carrier aggregation technology.

Figure 12:
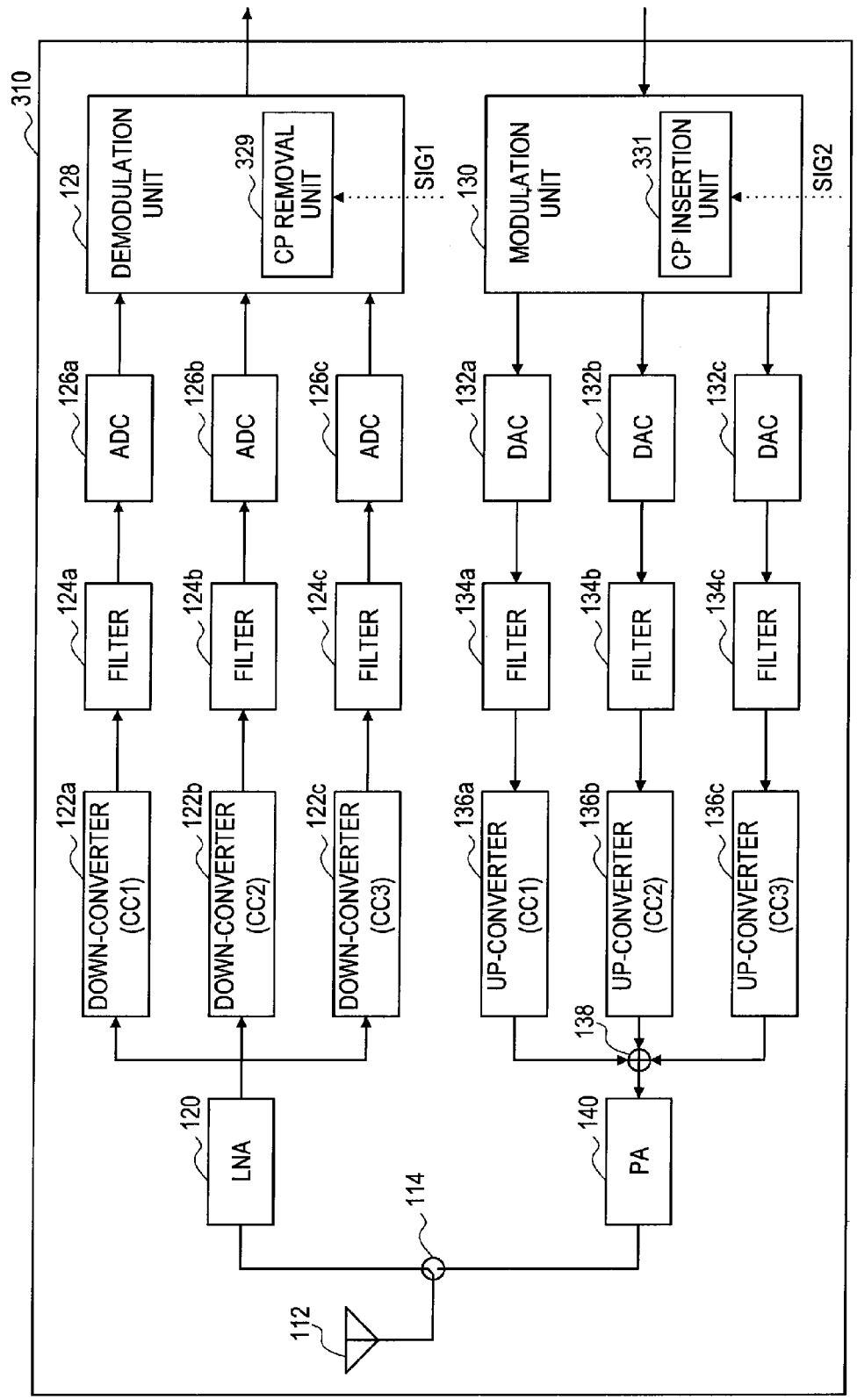
FIG. 12 is a block diagram showing an example of a detailed configuration of a radio communication unit according to the second embodiment.

FIG. 12 is a block diagram showing an example of a detailed configuration of the radio communication unit 310. Referring to FIG. 12, the demodulation unit 128 of the radio communication unit 310 includes a CPU removal unit 329. Further, the modulation unit 130 includes a CPU insertion unit 331.

The CPU removal unit 329 removes a cyclic prefix from the baseband signal of each component carrier which is input to the demodulation unit 128. The CP length of the cyclic prefix which is removed by the CPU removal unit 329 can be switched with respect to each sub-frame according to a CP length control signal SIG1 that is input from the control unit 360. Further, the CPU insertion unit 331 inserts a cyclic prefix into the baseband signal which is generated by the modulation unit 130. The CP length of the cyclic prefix which is inserted by the CPU insertion unit 331 can be switched with respect to each sub-frame according to a CP length control signal SIG2 that is input from the control unit 360. The operation of the radio communication unit 310 other than the switching of the setting of the CP length in the CPU removal unit 329 and the CPU insertion unit 331 may be the same as the operation of the radio communication unit 110 according to the first embodiment described above with reference to FIG. 5.

(Control Unit)

The control unit 360 controls the overall functions of the user equipment 300, like the control unit 160 according to the first embodiment. For example, the control unit 360 controls the timing of data communication by the radio communication unit 310 according to scheduling information that is received from the base station 400 by the radio communication unit 310. Further, in this embodiment, the control unit 360 switches the setting of the CP length of the CPU removal unit 329 and the CPU insertion unit 331 of the radio communication unit 310 with respect to each sub-frame according to the allocation of communication resources by outputting the CP length control signals SIG1 and SIG2 to the radio communication unit 310 at the state during a handover procedure (e.g. at the second and third stages described with reference to FIG. 10).

It should be noted that, the synchronization to a downlink channel from the base station is performed by using both of a primary synchronization signal that is transmitted in the first sub-frame and a secondary synchronization signal that is transmitted in the sixth sub-frame in one radio frame. Therefore, it is preferred in the synchronization processing to switch the base station to be synchronized with respect to each radio frame, not each sub-frame. Alternatively, in the radio communication unit 310, a synchronous circuit for the normal CP and a synchronous circuit for the extended CP may be placed in parallel in the radio communication unit 310. In this case, it is not necessary to switch the base station to be synchronized with respect to each radio frame. Because the synchronous circuit is implemented only in the physical layer, an impact on the system is small even when a plurality of synchronous circuits are placed in parallel.

Further, delivery of system information from the base station is also performed in a particular sub-frame in one radio frame. Therefore, for the reception of system information in the user equipment 100, like the synchronization processing described above, it is preferred to switch the base station to be synchronized with respect to each radio frame, not each sub-frame. In this case, because the base station 400 delivers the same system information over a plurality of successive radio frames, the user equipment 300 can acquire the system information of the source base station and the target base station without a loss.

(4-2. Exemplary Configuration of Base Station)

Figure 13:
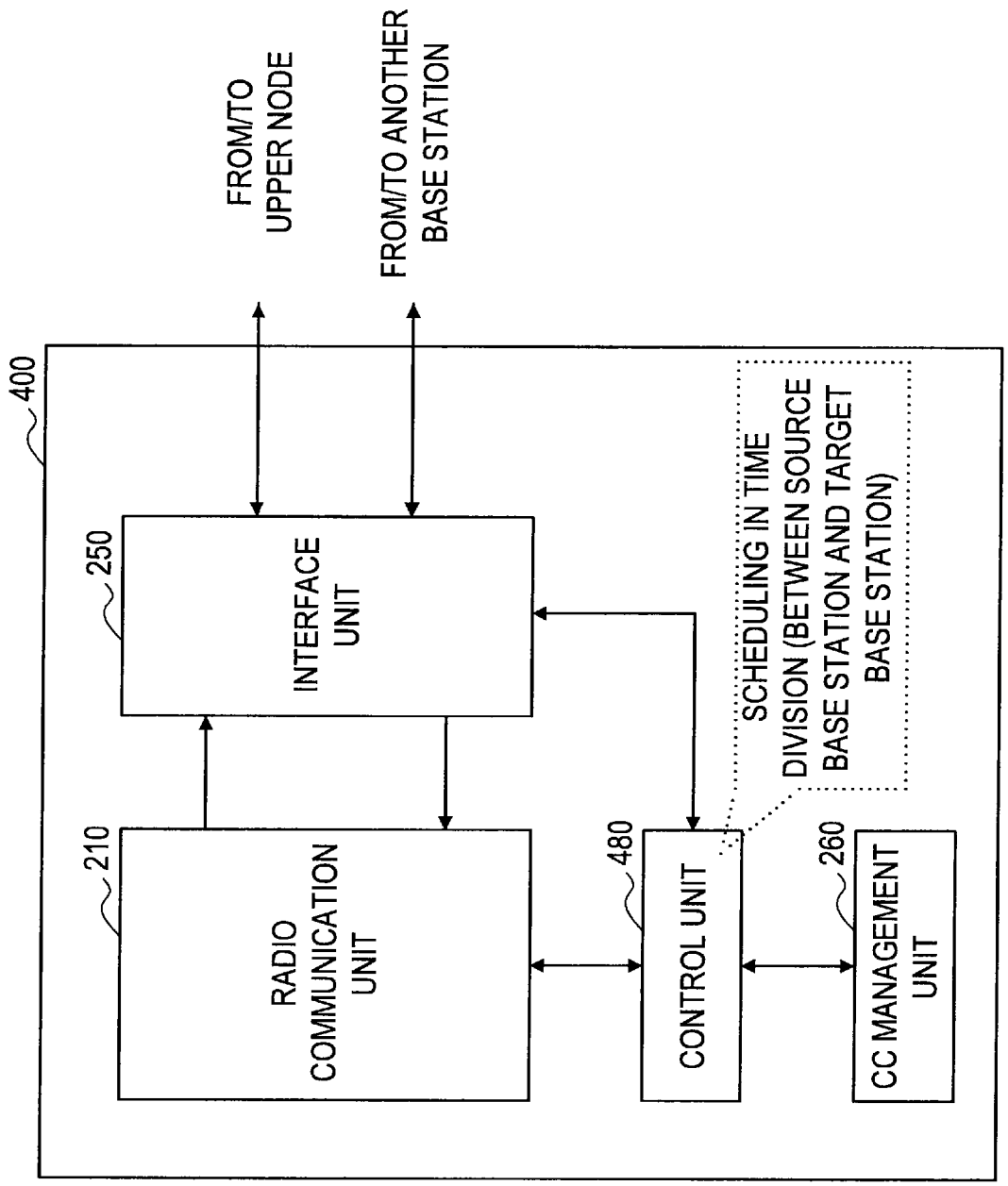
FIG. 13 is a block diagram showing an example of a configuration of a base station according to the second embodiment.

FIG. 13 is a block diagram showing an example of a configuration of the base station 400 according to the embodiment. Referring to FIG. 13, the base station 400 includes a radio communication unit 210, an interface unit 250, a CC management unit 260, and a control unit 480.

(Control Unit)

The control unit 480, like the control unit 280 according to the first embodiment, controls the overall functions of the base station 400. For example, the control unit 480 allocates communication resources for data communication to the user equipment 300 and other user equipments and then delivers scheduling information over a broadcast channel in a given sub-frame. Further, the control unit 480 delivers other system information over the broadcast channel, for example. The system information contains the set value of the CP length being used by the base station 400, for example.

In this embodiment, at a stage during a handover procedure, the control unit 480 of the source base station allocates a communication resource in a sub-frame, which is different from a sub-frame in which a communication resource is allocated by the target base station for a part of component carriers for which a handover is completed, for the rest of the component carriers. Specifically, the control unit 480 acquires scheduling information for a part of component carriers for which a handover is completed from the target base station through a backhaul link, for example. Then, the control unit 480 allocates a communication resource in a sub-frame in which a communication resource is not allocated in the scheduling information for the rest of the component carriers.

Further, the control unit 480 adjusts scheduling so that the ratio of the amount of communication resource allocated for a part of component carriers for which a handover is completed and the amount of communication resource allocated for the rest of the component carriers is substantially the same as the radio of the number of component carriers between the former and the latter. Specifically, the control unit 480 of the source base station acquires the ratio between the number of component carriers after handover completion and the number of component carriers before handover completion (which is referred to hereinafter as the ratio of the number of CCs) based on information exchange with the target base station. Then, the control unit 480 allocates communication resources to the user equipment 100 in such a way that the ratio of the amount of communication resources is substantially the same as the ratio of the number of CCs. Alternatively, the control unit 480 may designate the amount of communication resources which the target base station should allocate to the user equipment 100 to the target base station through a backhaul link.

(4-3. Flow of Process)

Figure 14:
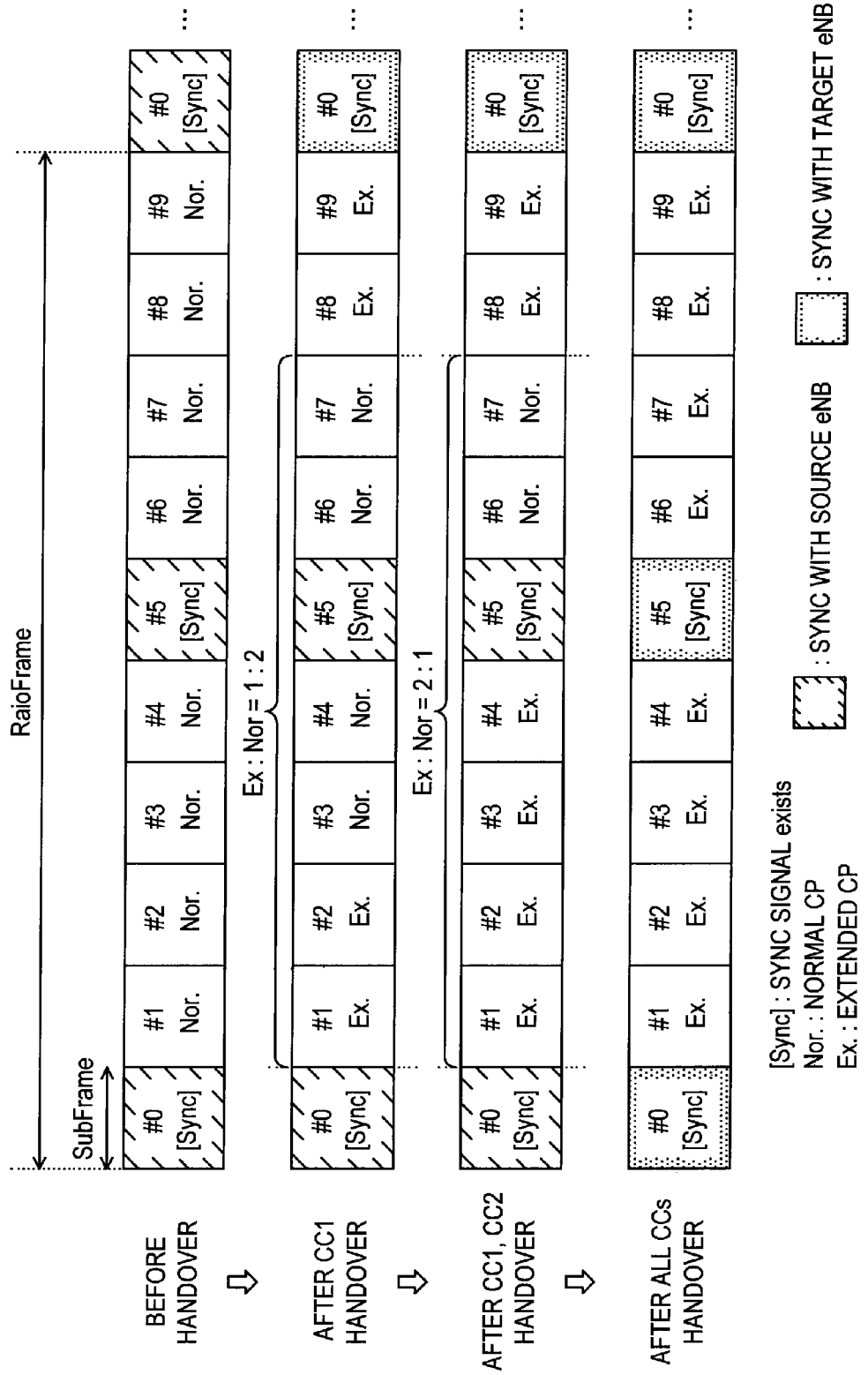
FIG. 14 is an explanatory view to describe an example of a flow of a handover procedure according to the second embodiment.

FIG. 14 is an explanatory view to describe an example of a flow of a handover procedure according to the embodiment. FIG. 14 shows an allocation of communication resources at the four stages related to the handover procedure which is performed in the same manner as shown in FIG. 10. Note that, in FIG. 14, like FIG. 10, the user equipment sequentially executes a handover from the source base station to the target base station for three component carriers CC1 to CC3.

First, at the first stage, all component carriers are connected to the source base station. Therefore, any sub-frame can be allocated for the component carriers before completion of a handover (using the normal CP). Note that it is not practically necessary to allocate communication resources to all of those sub-frames. Further, the synchronization signal is used for the synchronization with the source base station.

Next, at the second stage, the ratio of the number of CCs is 1:2 (after:before handover). Therefore, among the six successive sub-frames (excluding the sub-frame for the synchronization signal), for example, two sub-frames can be allocated for the component carrier after completion of a handover (using the extended CP), and four sub-frames can be allocated for the component carrier before completion of a handover. For example, when a handover is completed for the component carrier CC1, a first sub-frame (#1) and a second sub-frame (#2) can be allocated for the component carrier CC1. Further, after the synchronization signal in one radio frame is used for the synchronization with the source base station, the synchronization signal in the next radio frame can be used for the synchronization with the target base station.

Then, at the third stage, the ratio of the number of CCs is 2:1 (after:before handover). Therefore, among the six successive sub-frames (excluding the sub-frame for the synchronization signal), for example, four sub-frames can be allocated for the component carrier after completion of a handover (using the extended CP), and two sub-frames can be allocated for the component carrier before completion of a handover. For example, when a handover is completed for the component carrier CC2 subsequent to the component carrier CC1, a third sub-frame (#3) and a fourth sub-frame (#4) can be allocated for the component carrier CC2. Further, after the synchronization signal in one radio frame is used for the synchronization with the source base station, the synchronization signal in the next radio frame can be used for the synchronization with the target base station.

Finally, at the fourth stage, all component carriers are connected to the target base station. Therefore, any sub-frame can be allocated for the component carriers after completion of a handover. Further, the synchronization signal is used for the synchronization with the target base station.

(4-4. Summary of Second Embodiment)

The second embodiment of the present invention is described above with reference to FIGS. 10 to 14. According to the embodiment, when a handover to the target base station is completed only for a part of a plurality of component carriers, a communication resource in a sub-frame which is different from a sub-frame within which a communication resource is allocated by the target base station for the part of the plurality of component carriers is allocated by the source base station for the rest of the plurality of component carriers. In this configuration, a situation does not occur where the user equipment 300 performs a radio communication with the source base station and performs a radio communication with the target base station at the same time during a handover procedure. Therefore, the user equipment 300 can sequentially perform radio communications with the source base station and the target base station during a handover procedure by switching the CP length in time division manner. It is thereby possible to avoid simultaneous handling of different cyclic prefix lengths during a handover procedure in a radio communication involving the carrier aggregation.

Further, according to the embodiment, scheduling is adjusted so that the ratio of the amount of communication resource allocated by the target base station for the component carrier with handovers completed and the amount of communication resource allocated by the source base station for the component carrier with handovers not yet completed is substantially the same as the radio of the number of component carriers with handovers completed and the number of component carriers with handovers not yet completed. The amount of traffic is thereby equally shared among the component carriers, and it is thus possible to carry out data transmission during a handover procedure.

Further, the user equipment 300 may perform the synchronization with the source base station by using the synchronization signal in a radio frame which is different from a radio frame in which the synchronization signal to be used for the synchronization with the target base station is contained. Further, the user equipment 300 can receive system information from the source base station in a radio frame which is different from a radio frame in which system information from the target base station is received. This configuration eliminates the need for using a plurality of synchronous circuits or a plurality of processing units for handling different CP lengths, and it is thereby possible to suppress the manufacturing cost of the device.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 RADIO COMMUNICATION SYSTEM
100, 300 USER EQUIPMENT
110, 310 RADIO COMMUNICATION UNIT (USER EQUIPMENT)
160, 360 CONTROL UNIT (USER EQUIPMENT)
200, 400 BASE STATION
210 RADIO COMMUNICATION UNIT (BASE STATION)
280, 480 CONTROL UNIT (BASE STATION)

The invention claimed is:

1. A mobile station in a wireless communication network, the mobile station comprising:
one or more processors configured to:
communicate, through an antenna, with a first base station via at least one of a plurality of component carriers, wherein the first base station is associated with a first cyclic prefix length;
acquire a second cyclic prefix length of a second base station via a channel and perform measurement of a communication quality over the channel, concurrently;
receive, through the antenna, a plurality of handover commands for the plurality of component carriers from the first base station after acquiring the second cyclic prefix length, each of the plurality of handover commands being associated with a corresponding one of the plurality of component carriers;
perform a handover procedure with a random access to the second base station associated with the second cyclic prefix length different from the first cyclic prefix length, wherein the one or more processors wait to receive, through the antenna, all of the plurality of handover commands from the first base station to perform the handover of all of the plurality of component carriers to the second base station; and
communicate, through the antenna, with the second base station via at least one of the plurality of component carriers having the second cyclic prefix length.

2. The mobile station of claim 1, wherein each of the plurality of component carriers corresponds to at least one of a Long Term Evolution (LTE) frequency band and a Long Term Evolution-Advanced (LTE-A) frequency band, and
the plurality of component carriers forms at least one communication channel, the at least one communication channel being at least one of an LTE communication channel and an LTE-A communication channel.

3. The mobile station of claim 1, wherein the mobile station is configured to contemporaneously communicate over each of the plurality of component carriers.

4. A mobile station in a wireless communication network, the mobile station comprising:
one or more processors configured to:
communicate, through an antenna, with a first base station via a plurality of component carriers each having a first cyclic prefix length and each being assigned to one of a plurality of sub-frames; and
perform a handover procedure, for only one of the plurality of component carriers, from the first base station to a second base station after receiving, through the antenna, a handover command specific to the one of the plurality of component carriers and change the first cyclic prefix length associated with a first sub-frame of the plurality of sub-frames to a second cyclic prefix length different from the first cyclic prefix length,
wherein, after the handover procedure for the only one of the plurality of component carriers and during a single frame, the one or more processors are configured to communicate, through the antenna, with the second base station via the only one of the plurality of component carriers having the second cyclic prefix length and with the first base station via the plurality of component carriers having the first cyclic prefix length.

5. The mobile station of claim 4, wherein the one or more processors are further configured to release a first one of the plurality of component carrier connections with the first base station and to connect to the second base station, through the antenna, using the only one of the plurality of component carriers having the second cyclic prefix length.

6. The mobile station of claim 5, wherein the one or more processors are further configured to perform a handover procedure to the second base station, through the antenna, for a second one of the plurality of component carriers only after the handover procedure for the first one of the plurality of component carriers has been performed.

7. A first base station in a wireless communication network, the base station comprising:
one or more processors configured to:
communicate, through an antenna, with a mobile station via at least one of a plurality of component carriers, wherein the first base station is associated with a first cyclic prefix length;
receive, through the antenna, a plurality of reports from the mobile station, each of the plurality reports being associated with a corresponding one of the plurality of component carriers; and
send, through the antenna, a plurality of handover commands for the plurality of component carriers to the mobile station, each of the plurality of handover commands being associated with a corresponding one of the plurality of component carriers,
wherein a handover procedure to a second base station is performed after the one or more processors wait to receive, through the antenna, from the mobile station, all of the plurality of reports and to send, through the antenna, to the mobile station, all of the plurality of handover commands, wherein a second cyclic prefix length associated with the second base station is acquired via a channel concurrently with the measurement of communication quality over the channel.

8. The base station of claim 7, wherein the one or more processors are further configured to transmit a handover request command to the second base station and transmit, through the antenna, a handover command to the mobile station.

9. A base station in a wireless communication network, the base station comprising:
one or more processors configured to:
communicate, through an antenna, with a mobile station via a plurality of component carriers each having a first cyclic prefix length and each being assigned to one of a plurality of sub-frames; and
perform a handover procedure to a second base station, for only one of the plurality of component carriers, after sending, through the antenna, a handover command specific to the one of the plurality of component carriers and change the first cyclic prefix length associated with a first sub-frame of the plurality of sub-frames to a second cyclic prefix length different from the first cyclic prefix length,
wherein, after the handover procedure for the only one of the plurality of component carriers and during a single frame, the mobile station is configured to communicate, through the antenna, with the second base station via the only one of the plurality of component carriers having the second cyclic prefix length and with the first base station via the plurality of component carriers having the first cyclic prefix length.

10. The base station of claim 9, wherein the one or more processors are further configured to transmit, through the antenna, a handover request command to the second base station and transmit, through the antenna, a handover command to the mobile station.

11. A handover method performed by a mobile station in a wireless communication network, the method comprising:
communicating, by one or more processors of the mobile station, through an antenna, with a first base station via at least one of a plurality of component carriers, wherein the first base station is associated with a first cyclic prefix length;
acquiring a second cyclic prefix length of a second base station via a channel and performing measurement of a communication quality over the channel, concurrently;
receiving, by the one or more processors of the mobile station, through the antenna, a plurality handover commands for the plurality of component carriers from the first base station after acquiring the second cyclic prefix length, each of the plurality of handover commands being associated with a corresponding one of the plurality of component carriers;
performing a handover procedure with a random access to the second base station associated with the second cyclic prefix length different from the first cyclic prefix length, wherein the one or more processors wait to receive, through an antenna, all of the plurality of handover commands from the first base station to perform the handover of all of the plurality of component carriers to the second base station; and
communicating, through the antenna, with the second base station via at least one of the plurality of component carriers having the second cyclic prefix length.

12. A handover method performed by a mobile station in a wireless communication network, the method comprising:
communicating, by processing circuitry of the mobile station, with a first base station via a plurality of component carriers each having a first cyclic prefix length and each being assigned to one of a plurality of sub-frames;
performing, by the processing circuitry of the mobile station, a handover procedure, for only one of the plurality of component carriers, from the first base station to the second base station after receiving a handover command specific to the one of the plurality of component carriers and change the first cyclic prefix length associated with a first sub-frame of the plurality of sub-frames to a second cyclic prefix length different from the first cyclic prefix length; and
controlling, by the processing circuitry, after the handover procedure for the only one of the plurality of component carriers and during a single frame, communication, by the processing circuitry, with the second base station via the only one of the plurality of component carriers having the second cyclic prefix length and with the first base station via the plurality of component carriers having the first cyclic prefix length.

13. A handover method performed by a first base station in a wireless communication network, the method comprising:
communicating, by one or more processors of the base station, with a mobile station via at least one of a plurality of component carriers, wherein the first base station is associated with a first cyclic prefix length;
receiving, by the one or more processors of the base station, a plurality of reports from the mobile station, each of the plurality reports being associated with a corresponding one of the plurality of component carriers; and
sending, by the one or more processors of the base station, a plurality of handover commands for the plurality of component carriers to the mobile station, each of the plurality of handover commands being associated with a corresponding one of the plurality of component carriers,
wherein a handover procedure to a second base station is performed after waiting to receive, from the mobile station, all of the plurality of reports and to send, to the mobile station, all of the plurality of handover commands, wherein a second cyclic prefix length associated with the second base station is acquired via a channel concurrently with the measurement of communication quality over the channel.

14. A handover method performed by a base station in a wireless communication network, the method comprising:
communicating, by processing circuitry of the base station, with a mobile station via a plurality of component carriers each having a first cyclic prefix length and each being assigned to one of a plurality of sub-frames;
performing, by the processing circuitry of the base station, a handover procedure to a second base station for only one of the plurality of component carriers, after sending a handover command specific to the one of the plurality of component carriers and change the first cyclic prefix length associated with a first sub-frame of the plurality of sub-frames to a second cyclic prefix length different from the first cyclic prefix length; and
after the handover procedure for the only one of the plurality of component carriers and during a single frame, communicating, by processing circuitry of the mobile station, with the second base station via the only one of the plurality of component carriers having the second cyclic prefix length and with the first base station via the plurality of component carriers having the first cyclic prefix length.

15. A non-transitory computer-readable medium including computer-executable instructions, which when executed by a mobile station in a wireless communication network, cause the mobile station to perform a handover method comprising:
communicating with a first base station via at least one of a plurality of component carriers, wherein the first base station is associated with a first cyclic prefix length;
acquiring a second cyclic prefix length of a second base station via a channel and performing measurement of a communication quality over the channel, concurrently;
receiving a plurality of handover commands for the plurality of component carriers from the first base station after acquiring the second cyclic prefix length, each of the plurality of handover commands being associated with a corresponding one of the plurality of component carriers;
performing a handover procedure with a random access to the second base station associated with the second cyclic prefix length different from the first cyclic prefix length, wherein the mobile station waits to receive all of the plurality of handover commands from the first base station to perform the handover of all of the plurality of component carriers to the second base station; and
communicating with the second base station via at least one of the plurality of component carriers having the second cyclic prefix length.

16. A non-transitory computer-readable medium including computer-executable instructions, which when executed by a mobile station in a wireless communication network, cause the mobile station to perform a handover method comprising:
communicating with a first base station via a plurality of component carriers each having a first cyclic prefix length and each being assigned to one of a plurality of sub-frames;
performing a handover procedure, for only one of the plurality of component carriers, from the first base station to the second base station after receiving a handover command specific to the one of the plurality of component carriers and change the first cyclic prefix length associated with a first sub-frame of the plurality of sub-frames to a second cyclic prefix length different from the first cyclic prefix length; and
after the handover procedure for the only one of the plurality of component carriers and during a single frame, communicating with the second base station via the only one of the plurality of component carriers having the second cyclic prefix length and with the first base station via the plurality of component carriers having the first cyclic prefix length.

17. A non-transitory computer-readable medium including computer-executable instructions, which when executed by a first base station in a wireless communication network, cause the first base station to perform a handover method comprising:
communicating with a mobile station via at least one of a plurality of component carriers, wherein the first base station is associated with a first cyclic prefix length;
receiving a plurality of reports from the mobile station, each of the plurality reports being associated with a corresponding one the plurality of component carriers; and
sending a plurality of handover commands for the plurality of component carriers to the mobile station, each of the plurality of handover commands being associated with a corresponding one of the plurality of component carriers,
wherein a handover procedure to a second base station is performed after waiting to receive, from the mobile station, all of the plurality of reports and to send, to the mobile station, all of the plurality of handover commands, wherein a second cyclic prefix length associated with the second base station is acquired via a channel concurrently with the measurement of communication quality over the channel.

18. A non-transitory computer-readable medium including computer-executable instructions, which when executed by a base station in a wireless communication network, cause the base station to perform a handover method comprising:
communicating with a mobile station via a plurality of component carriers each having a first cyclic prefix length and each being assigned to one of a plurality of sub-frames; and
performing a handover procedure to a second base station for only one of the plurality of component carriers after sending a handover command specific to the one of the plurality of component carriers and change the first cyclic prefix length associated with a first sub-frame of the plurality of sub-frames to a second cyclic prefix length different from the first cyclic prefix length,
wherein, after the handover procedure for the only one of the plurality of component carriers and during a single frame, the mobile station communicates with the second base station via the only one of the plurality of component carriers having the second cyclic prefix length and with the first base station via the plurality of component carriers, having the first cyclic prefix length.

19. A wireless communication system comprising:
a mobile station including a first set of one or more processors configured to communicate, through an antenna, with a first base station via at least one of a plurality of component carriers, wherein the first base station is associated with a first cyclic prefix length;

the first base station including a second set of one or more processors configured to receive a plurality of reports, communicated through the antenna, from the mobile station, each of the plurality reports being associated with a corresponding one of the plurality of component carriers, wherein the first set of processors is configured to:

acquire a second cyclic prefix length of a second base station via a channel and perform measurement of a communication quality over the channel, concurrently;

receive, through the antenna, a plurality of handover commands for the plurality of component carriers from the first base station after acquiring the second cyclic prefix length, each of the plurality of handover commands being associated with a corresponding one of the plurality of component carriers, perform a handover procedure with a random access to the second base station associated with the second cyclic prefix length different from the first cyclic prefix length, wherein the first set of processors waits to receive, through the antenna, all of the plurality of handover commands from the first base station to perform the handover of all of the plurality of component carriers to the second base station, and communicate, through the antenna, with the second base station via at least one of the plurality of component carriers having the second cyclic prefix length.

20. A wireless communication system comprising:

a first base station configured to communicate with a mobile station via a plurality of component carriers each having a first cyclic prefix length and each being assigned to one of a plurality of sub-frames;

the mobile station configured to perform a handover procedure from the first base station to a second base station for only one of the plurality of component carriers after receiving a handover command specific to the one of the plurality of component carriers and change the first cyclic prefix length associated with a first sub-frame of the plurality of sub-frames to a second cyclic prefix length different from the first cyclic prefix length from the first base station; and the second base station configured to communicate with the mobile station via the only one of the plurality of component carriers, wherein after the handover procedure for the only one of the plurality of component carriers and during a single frame, processing circuitry of the mobile station concurrently communicates with the second base station via the only one of the plurality of component carriers having the second cyclic prefix length and with the first base station via having the first cyclic prefix length.

* * * * *